(12) United States Patent
Marc et al.

(10) Patent No.: US 9,739,901 B2
(45) Date of Patent: *Aug. 22, 2017

(54) SIMULTANEOUS SHOOTING NODAL ACQUISITION SEISMIC SURVEY METHODS

(71) Applicant: Fairfield Industries Incorporated, Sugar Land, TX (US)

(72) Inventors: Etienne Marc, Houston, TX (US); Cliff Ray, Fulshear, TX (US); James Nelson Thompson, Sugar Land, TX (US)

(73) Assignee: FAIRFIELD INDUSTRIES INCORPORATED, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/170,610

(22) Filed: Jun. 1, 2016

(65) Prior Publication Data
US 2016/0274254 A1    Sep. 22, 2016

Related U.S. Application Data

(63) Continuation of application No. 13/829,210, filed on Mar. 14, 2013, now Pat. No. 9,360,575.

(60) Provisional application No. 61/751,766, filed on Jan. 11, 2013.

(51) Int. Cl.
*G01V 1/38* (2006.01)
*G01V 1/24* (2006.01)

(52) U.S. Cl.
CPC ............ *G01V 1/247* (2013.01); *G01V 1/3852* (2013.01); *G01V 1/38* (2013.01); *G01V 2210/1427* (2013.01)

(58) Field of Classification Search
CPC ........ G01V 1/3852; G01V 1/247; G01V 1/38; G01V 2210/1427

USPC .............................................. 367/14, 15, 21
See application file for complete search history.

(56) References Cited

U.S. PATENT DOCUMENTS

| | | |
|---|---|---|
| 3,670,988 A | 6/1972 | Leonard |
| 3,921,124 A | 11/1975 | Payton |
| 4,063,213 A | 12/1977 | Itria et al. |
| 4,087,780 A | 5/1978 | Itria et al. |
| 4,711,194 A | 12/1987 | Fowler |
| 4,729,333 A | 3/1988 | Kirby et al. |
| 5,189,642 A | 2/1993 | Donoho et al. |
| 5,353,223 A | 10/1994 | Norton et al. |
| 5,532,975 A | 7/1996 | Elholm |
| 5,548,562 A | 8/1996 | Helgerud et al. |
| 5,717,655 A | 2/1998 | Beasley |
| 5,761,152 A | 6/1998 | Jacobsen et al. |
| 5,774,417 A | 6/1998 | Corrigan et al. |
| 5,818,795 A | 10/1998 | Hawkins et al. |

(Continued)

FOREIGN PATENT DOCUMENTS

| | | |
|---|---|---|
| GB | 2 414 804 B | 1/2008 |
| WO | WO-2005/096018 | 10/2005 |

OTHER PUBLICATIONS

Hansen, et al., 'Innovations in Time', First Break, vol. 25, No. 6, Jun. 2007 (Abstract only).

(Continued)

*Primary Examiner* — Daniel L Murphy
(74) *Attorney, Agent, or Firm* — Foley & Lardner LLP; James De Vellis

(57) ABSTRACT

A method of performing a seismic survey including: deploying nodal seismic sensors at positions in a survey region; activating a plurality of seismic sources; and using the nodal seismic sensors to record seismic signals generated in response to the activation of the plurality of signals.

20 Claims, 12 Drawing Sheets

(56) References Cited

U.S. PATENT DOCUMENTS

| | | | |
|---|---|---|---|
| 6,024,344 A | 2/2000 | Buckley et al. | |
| 6,314,371 B1 | 11/2001 | Monk | |
| 6,539,308 B2 | 3/2003 | Monk et al. | |
| 6,545,944 B2 | 4/2003 | De Kok | |
| 6,590,831 B1 | 7/2003 | Bennett et al. | |
| 6,691,038 B2 | 2/2004 | Zajac | |
| 6,775,203 B2 | 8/2004 | Fagerås et al. | |
| 7,203,130 B1 | 4/2007 | Welker | |
| 7,286,442 B2* | 10/2007 | Ray | G01V 1/247 346/33 C |
| 7,400,552 B2 | 7/2008 | Moldoveanu et al. | |
| 7,561,493 B2 | 7/2009 | Ray et al. | |
| 7,577,060 B2 | 8/2009 | Toennessen et al. | |
| 7,755,970 B2 | 7/2010 | Welker et al. | |
| 7,804,738 B2 | 9/2010 | Storteig et al. | |
| 7,957,220 B2 | 6/2011 | Howlid et al. | |
| 8,391,102 B2 | 3/2013 | Holo | |
| 8,547,782 B2 | 10/2013 | Howlid et al. | |
| 8,570,830 B2 | 10/2013 | Storteig et al. | |
| 8,824,239 B2 | 9/2014 | Welker et al. | |
| 9,304,222 B2 | 4/2016 | Ni et al. | |
| 9,360,575 B2* | 6/2016 | Etienne | G01V 1/3852 |
| 2004/0013037 A1 | 1/2004 | Vaage | |
| 2005/0120796 A1 | 6/2005 | Nash et al. | |
| 2006/0159524 A1 | 7/2006 | Thompson et al. | |
| 2007/0247971 A1 | 10/2007 | Semb et al. | |
| 2009/0092005 A1 | 4/2009 | Goujon et al. | |
| 2009/0290453 A1 | 11/2009 | Ray et al. | |
| 2009/0323472 A1* | 12/2009 | Howe | G01V 1/005 367/41 |
| 2010/0008185 A1 | 1/2010 | Moldoveanu | |
| 2010/0271904 A1 | 10/2010 | Moore et al. | |
| 2011/0158044 A1 | 6/2011 | Moldoveanu et al. | |
| 2011/0194378 A1 | 8/2011 | Decker et al. | |
| 2011/0266086 A1 | 11/2011 | Welker et al. | |
| 2011/0286900 A1 | 11/2011 | Caudle et al. | |
| 2012/0147699 A1 | 6/2012 | Dellinger et al. | |
| 2013/0155805 A1 | 6/2013 | Tonchia | |

OTHER PUBLICATIONS

Paulsen, et al. 'Improved Marine 4D Repeatability Using an Automated Vessel, Source and Receiver Positioning System', 70th EAGE Conference and Exhibition Incorporating SPE EUROPEC 2008, Jun. 9, 2008 (Abstract only).

Ross et al., 'Lessons Through Time in 4D Seismic', First Break, vol. 25, No. 12, Dec. 2007 (Abstract only).

U.S. Appl. No. 61/722,024, filed Nov. 2, 2012, Fairfield Industries Inc.

"Reflection seismology," 2011, Wikipedia, downloaded Aug. 16, 2015 from https://en.wikipedia.org/w/index.php?title=Reflection-seismology&oldid=445157440, 10 pp.

"Reflection seismology," 2015, Wikipedia, downloaded Aug. 15, 2015 from https://en.wikipedia.org/wiki/Reflection-seismology# Marine-survey-acquisition-.28Ocean-bottom-.26-4D.29, 16 pp.

"Simultaneous Source Methodology", Tech Link, vol. 9, No. 2, Feb. 2009, 4 pages.

Berkhout et al., "The Concept of Double Blending: Combining Incoherent Shooting With Incoherent Sensing," Geophysics, 74(9):A59-A62 (2009).

Donoho, L. L., 2006, Compressed sensing: IEEE Transactions on Information Theory, 52, No. 4, 1289-1306, doi:10.1109/TIT.2006. 871582.

Godwin et al., "Simultaneous Source Imaging by Amplitude Encoding," Center for Wave Phenomena, Colorado School of Mines, 645:21-42 (2010).

Hennenfent et al., Simply Denoise: Wavefield reconstruction via Jittered Undersampling: Geophysics, 73, No. 3, V19-V28 (2008).

Herrmann, Sub-Nyquist Sampling and Sparsity: How to get More Information from Fewer Samples: 79th Annual International Meeting, SEG, Extended Abstracts 28, 3410-3413 (2009).

International Preliminary Report on Patentability for PCT/US2014/010472 dated Jul. 23, 2015.

International Search Report and Written Opinion in PCT/US2014/010472 dated May 2, 2014.

Mahmood, Investigating different approaches of deblending seismic data, Master Thesis, Department of Geosciences, University of Oslo, Faculty of Mathematics and Natural Sciences, 2012.

Monk et al., Simultaneous sources: The inaugural full-field, marine seismic case history from Australia, 22nd International Geophysical Conference and Exhibition, Feb. 26-29, 2012, Brisbane, Australia, pp. 1-4.

Moore et al., "Simultaneous sources: The inaugural full-field, marine seismic case history from Australia," 22nd International Geophysical Conference and Exhibition, Feb. 26-29, 2012.

US Notice of Allowance on U.S. Appl. No. 13/829,210 dated Feb. 9, 2016.

US Office Action on U.S. Appl. No. 13/829,210 dated Aug. 24, 2015.

\* cited by examiner

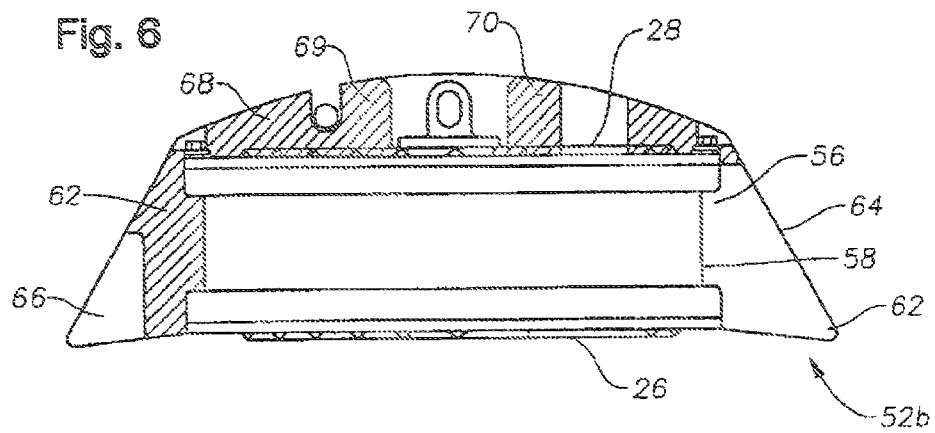
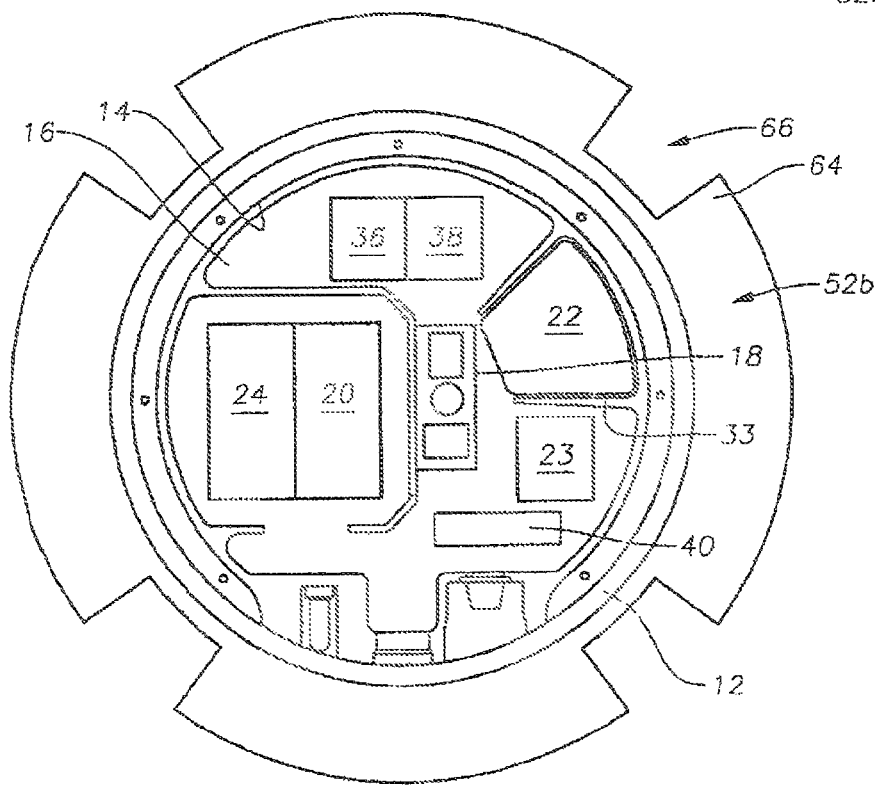

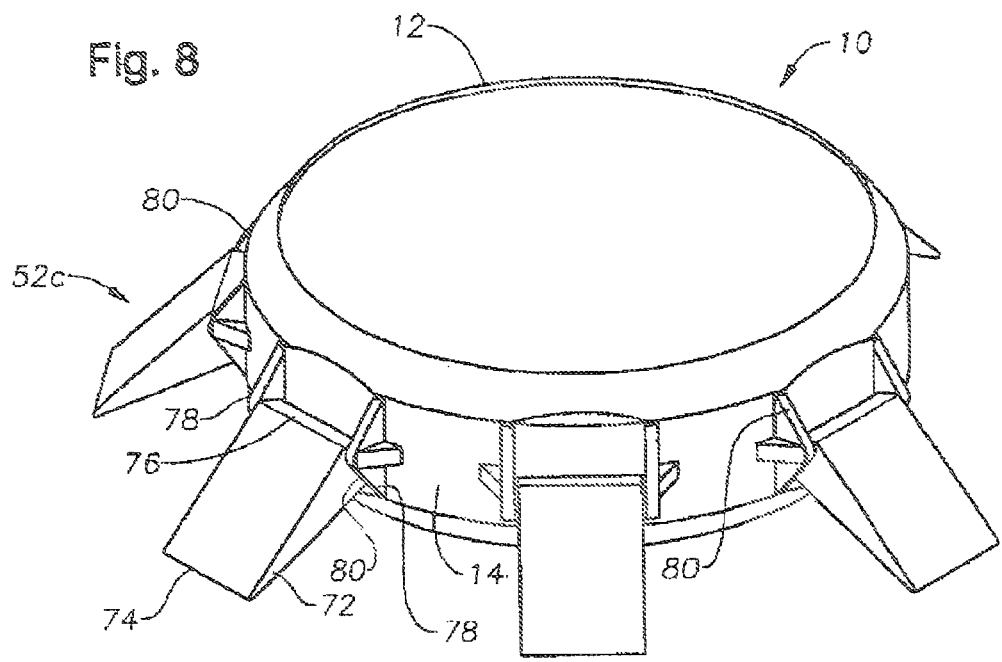

SIMULTANEOUS SHOOTING NODAL ACQUISITION SEISMIC SURVEY METHODS

CROSS-REFERENCE TO RELATED APPLICATIONS

This application claims a priority benefit under 35 U.S.C. §120 to U.S. patent application Ser. No. 13/829,210, filed Mar. 14, 2013, titled "Simultaneous Shooting Nodal Acquisition Seismic Survey Methods", which claims a priority benefit under 35 U.S.C. §119(e), to U.S. provisional patent application Ser. No. 61/751,766, filed Jan. 11, 2013, titled "Simultaneous Shooting Nodal Acquisition Seismic Survey Methods." Each of the foregoing applications are incorporated herein by reference in their entirety.

BACKGROUND OF THE INVENTION

Seismic exploration generally utilizes a seismic energy source to generate an acoustic signal that propagates into the earth and is partially reflected by subsurface seismic reflectors (i.e., interfaces between subsurface lithologic or fluid layers characterized by different elastic properties). The reflected signals (known as "seismic reflections") are detected and recorded by seismic receivers located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Typically, the seismic receivers are laid out in an array, wherein the array of seismic receivers consist of a single string of receivers distributed along a line in order to record data from the seismic cross-section below the line of receivers. For data over a larger area and for three-dimensional representations of a formation, multiple strings of receivers may be set out side-by-side, such that a grid of receivers is formed. Often, the receivers within an array are remotely located or spread apart. In land seismic surveys for example, hundreds to thousands of receivers, called geophones, may be deployed in a spatially diverse manner, such as a typical grid configuration where each string extends for 1600 meters with detectors spaced every 50 meters and the successive strings are spaced 500 meters apart. In marine surveys, a towed streamer having receivers, called hydrophones, attached thereto may trail up to 12,000 meters behind the tow vessel.

Generally, several receivers are connected in a parallel series combination on a single twisted pair of wires to form a single receiver group or channel. During the data collection process, the output from each channel is digitized and recorded for subsequent analysis. In turn, the groups of receivers are usually connected to cables used to communicate with the receivers and transport the collected data to recorders located at a central location. More specifically, when such surveys are conducted on land, cable telemetry for data transmission is used for detector units required to be interconnected by cables. Other systems use wireless methods for data transmission so that the individual detector units are not connected to each other. Still other systems temporarily store the data until the data is extracted.

While the fundamental process for detection and recording of seismic reflections is the same on land and in marine environments, marine environments present unique problems due to the body of water overlaying the earth's surface, most notably the high pressure of deep water activities and the corrosive environment of salt water activities. In addition, even simple deployment and retrieval is complicated since operations must be conducted off the deck of a seismic exploration vessel, where external elements such as wave action, weather and limited space can greatly affect the operation.

In one common method of marine seismic exploration, seismic operations are conducted at the surface of the water body, Marine vessels tow streamers in which are embedded hydrophones for detecting energy reflected back up through the water column. The streamers are typically comprised of hydrophone strings, other electrical conductors, and material for providing near neutral buoyancy. The streamers are made to float near the water's surface. The same or other similar marine vessels tow acoustic energy sources, such as air guns, to discharge energy pulses which travel downwardly into subsurface geologic formations underlying the water.

Systems placed on the ocean bottom floor have also been in use for many years. These devices are typically referred to as "OBC" (Ocean Bottom Cabling) or "OBS" (Ocean Bottom Seismometer) systems. The prior art has centered on three main groups of ocean bottom apparatus to measure seismic signals at the seafloor. The first type of apparatus is an OBC system, similar to the towed streamer, which consists of a wire cable that contains geophones and/or hydrophones and which is laid on the ocean floor, where the detector units are interconnected with cable telemetry. Typically, a seismic vessel will deploy the cable off the bow or stern of the vessel and retrieve the cable at the opposite end of the vessel. OBC systems such as this can have drawbacks that arise from the physical configuration of the cable. For example, when three-dimensional geophones are employed, because the cable and geophones are not rigidly coupled to the sediment on the ocean floor, horizontal motion other than that due to the sediment, such as for example, ocean bottom currents, can cause erroneous signals. In this same vein, because of its elongated structure, OBC systems tend to have satisfactory coupling only along the major axis of the cable when attempting to record shear wave data. In addition, three ships are required to conduct such operations since, in addition to a seismic energy source vessel, a specially equipped vessel is necessary for cable deployment and a separate vessel is needed for recording. The recording vessel is usually stationary attached to the cable while the deployment vessel is generally in constant motion along the receiver line deploying and retrieving cable. Because the recording vessel is in constant physical contact with the cable, the effort required to maintain the vessel's position, wave action and ocean currents can generate-great tension within the cable, increasing the likelihood of a broken cable or failed equipment, as well as the introduction of signal interference into the cable. Finally, such cable systems have a high capital investment and are generally costly to operate.

A second type of recording system is an OBS system in which a sensor package and electronics package is anchored to the sea floor. The device digitizes the signals and typically uses a wire cable to transmit data to a radio unit attached to the anchored cable and floating on the water surface. The floating transmitter unit then transmits the data to a surface vessel where the seismic data are recorded. Multiple units are typically deployed in a seismic survey.

A third type of seismic recording device is an OBS system known as Seafloor Seismic Recorders (SSR's). These devices contain the sensors and electronics in sealed packages, and record signals on the seafloor. Data are retrieved by retrieving the device from the seafloor. Such devices are typically reusable. The focus of the present invention is on SSR type of OBS systems.

SSR type OBS systems generally include one or more geophone and/or hydrophone sensors, a power source, a seismic data recorder, a crystal oscillator clock, a control circuit, and, in instances when gimbaled geophones are used and shear data are recorded, a compass or gimbal. Except to the extent power is provided from an outside source via a cable, the power source is generally a battery package. To the extent prior art OBS systems have utilized on-board batteries, as opposed to external cabling, to supply power, the prior art batteries have been lead-acid, alkaline or non-rechargeable batteries. All of the OBS systems of the prior art generally require that the individual units be opened up for various maintenance, quality control and data extraction activities. For example, data extraction from prior art units require the units be physically opened or disassembled to extract data. Likewise, the unit must be opened up to replace spent batteries.

With respect to the timing function of the OBS system, synchronization between the timing of the sensor data and the firing of the seismic energy source or shot is critical in order to match a seismic source event with a reflection event. In the past, various crystal oscillator clocks have been used in OBS systems for this function. The clocks are relatively inexpensive and accurate. One drawback to such prior art clocks, however, is that the dock crystals are subject to gravitational and temperature effects. These gravitational and temperature effects can cause a frequency shift in the oscillator frequency, thereby resulting in errors in the seismic data. In addition, since the crystals are subject to gravitational effects, orientation of the OBS system can effect operation of the clock. Since the clock is typically secured within the OBS package so as to be correctly oriented when the OBS system is properly oriented on the ocean floor, any misorientation of the OBS system on the ocean floor can result in clock inaccuracies. Finally, such clocks often are characterized by drift and time shifts due to temperature changes and aging, which again, can cause inaccuracies in the recorded seismic data. While it may be possible that mathematical corrections could be made to the data to account for temperature aging and time shifts, there is no prior art device that corrects for gravitational effects on the crystal clock. At most, the prior art only corrects for effects of temperature on the crystal clocks.

More modern OBS systems may also include a mechanical device to correct for tilt, namely a gimbal. A gimbal is a device that permits free angular movement in one or more directions and is used to determine orientation of the OBS system on the ocean floor. Orientation data generated by the gimbal can then be used to adjust the seismic data recorded by the geophones. To the extent the prior art utilizes gimbals, they are most often incorporated as part of the geophone itself, which are referred to as "gimbaled geophones." One drawback to these mechanical gimbals of the prior art is the limited angular orientation permitted by the devices. For example, at least one of the prior art devices permit a gimbal roll of 360° but is limited in gimbal pitch to 30°. For this device, in order for such prior art gimbals to function properly, the OBS system itself must settle on the ocean floor in substantially the desired position. To the extent the OBS system is not oriented at least substantially in the horizontal, such as settling on its side or upside down, the mechanical gimbal of the prior art may not function properly. Other gimbaled devices of a mechanical nature are not limited by 30°, however, in such mechanically gimbaled devices, mechanical dampening in the device can deteriorate the fidelity of the recorded signal. Finally, gimballing of a geophone is expensive and requires more space than a non-gimballed geophone. For OBS systems that utilize multiple geophones, it may be impractical to gimbal the geophones due to size and space requirements.

As with orientation, the location of OBS system on the ocean floor is necessary to properly interpret seismic data recorded by the system. The accuracy of the processed data depends in part on the accuracy of the location information used to process the data. Since conventional location devices such as GPS will not operate in the water environments, traditional prior art methods for establishing the location of the OBS systems on the ocean floor include sonar. For example, with a sonar system, the OBS device may be "pinged" to determine its location. In any event, the accuracy of the processed data is directly dependent on the precision with which the location of the OBS system is determined. Thus, it is—highly desirable to utilize methods and devices that will produce dependable location information.

In this same vein, it is highly desirable to ensure that the planned positioning of the OHS device on the ocean floor is achieved.

With respect to operation of the aforementioned OBS systems, the prior art systems generally require some externally generated control command in order to initiate and acquire data for each shot. Thus the seismic receiver units must be either physically connected to the central control recording station or "connectable" by wireless techniques. As mentioned above, those skilled in the art will understand that certain environments can present extreme challenges for conventional methods of connecting and controlling the detectors, such as congested or deep marine areas, rugged mountain areas and jungles. Difficulties may also arise in instances where the receiver array is periodically moved to cover a larger area.

Whatever the case, each type of connection, whether via a physical cable or through wireless techniques, has its own drawbacks. In cable telemetry systems, large arrays or long streamers result in large quantities of electrically conductive cabling that are expensive and difficult to handle, deploy or otherwise manipulate. In instances where ocean bottom cabling is used, the corrosive environment and high pressures often require costly cable armoring in water depths over 500 feet. Furthermore, conventional cabling also requires a physical connection between the cable and the sensor unit. Since it is generally not practical to hard wire sensors on a cable, the more conventional technique is to attach cabling to sensors using external connections between the cable and the sensor. This point of the connection between the cable and the sensor is particularly vulnerable to damage, especially in corrosive, high pressure marine environments. Of course, with systems that are physically cabled together, it is much easier to provide power to the sensors, to synchronize sensors with the shot time and with each other and to otherwise control the sensors.

It should be noted that whether for cabled or wireless systems, where external cabling is required to connect the sensor package of the equipment with the recording and/or radio telemetry packages of the unit, many of the aforementioned drawbacks exist. Specifically, the OBS systems of the prior art are comprised of separate sensing and recording/radio telemetry units or packages mounted on a carriage. The separate units have external connectors that are cabled together, presenting many of the same problems as cabling from the central control on the surface of the water. The primary reason for the separation between the sensing units, i.e., the geophone package, and the remainder of the electronics is the need to ensure that the geophones are effectively coupled to the ocean floor.

In cases where either wireless technology is utilized or operation of sensors is through pre-programming, control of the sensors becomes more difficult. For example, ensuring that recording is synchronized with the shot timing is crucial since the individual sensors are not wired together as described above. Hence the need for accurate on-board clocks as mentioned above. In this regard, activating each unit for sensing and recording at the appropriate time must coincide with the shot. Ensuring that the units are sufficiently powered has also heretofore been a concern. Many prior art patents have focused on techniques and mechanisms for powering up sensors during data acquisition and recording and powering down the sensors during dormant periods.

Various attempts have been made to address some of the above-mentioned drawbacks. For example, a seafloor seismic recorder is described in U.S. Pat. No. 5,189,642. This patent discloses an elongated, upright chassis formed of spaced apart, horizontal ring plates connected by vertical leg members. Each leg member is formed of nested tubes that can slide relative to one another and that are secured to one another by a clamp mechanism. Releasably attached to the lower plate is a ballast ring. Also attached to the lower plate is the geophone package. Attached to the upper plate is a foam buoy. A control package extends down from the upper plate. The control package houses a power source, a seismic data recorder, a compass and a control circuit. An external hard wire electrically connects the control package with the geophone package. The system does not utilize any hard-wired communications link to the surface monitoring station but utilizes acoustical or preprogrammed means for controlling the unit. When released into the water, the ballast ring is supposed to provide sufficient mass to maintain the system upright and couple the geophones to the ocean floor upon settling. To minimize the likelihood of geophone noise produced by wave or water current motion acting against the buoy and control package, once the system is coupled to the ocean bottom, the clamp mechanism on each leg is released, allowing the control package and buoy to slide upward on the nested legs, isolating the geophones from the other parts of the system. Once seismic recording is complete, the ballast ring is then released from the chassis, and the system rises to the water surface under the positive buoyancy of the ballast. Acoustic transducers, a radio beacon and strobe light are provided to permit the system to be located and retrieved.

Another marine seismic data recording system is taught in U.S. Pat. No. 6,024,344. This patent teaches a method for deploying and positioning seismic data recorders in deep water. From a surface vessel, data recorders are attached to a semirigid wire which is deployed into the water. Due to the rigid nature of the wire, it functions to define a fixed interval between recorders as the recorders and wire sink to the seafloor. The wire also provides electrical communication for power or signals between adjacent recorders and between recorders and the vessel. Once the recorders are in place, they are activated either by way of a preset clock or by utilizing a control signal transmitted through the water or through the wire. Upon completion of data gathering, the wire and recorders are retrieved. Deployment is accomplished utilizing a cable engine positioned on the surface vessel. As shown in FIG. 1 of the '344 patent, deployment occurs over the stern of the vessel as it moves in a direction away from the wire and recorders. This patent also teaches the need to store the recorders in a sequential manner to facilitate deployment and to track the seafloor location of the OBS system during data collection.

GeoPro offers a self-contained, i.e., cable-less, OBS system comprised of a 430 mm diameter glass sphere in which is enclosed all electrical components for the system, including batteries, a radio beacon, a seismic data recording unit, an acoustic release system, a deep sea hydrophone and three gimble mounted geophones. The sphere is mounted on a weighted skid that counteracts the buoyancy of the sphere and anchors the OBS system to the sea bed. The geophones are positioned in the bottom of the sphere adjacent the skid. To recover the OBS system upon completion of data collection, an acoustical command signal is transmitted to the sphere and detected by the deep sea hydrophone. The signal activates the acoustic release system which causes the sphere to separate from the weighted skid, which remains on the sea floor. Under, positive buoyancy of the sphere, the free-floating system rises to the ocean surface, where the radio beacon transmits a signal for locating and retrieving the sphere. One drawback to this particular design is that the geophones are not coupled directly to the ocean floor. Rather, any seismic signal recorded by the geophones must pass through the skid and the bottom of the sphere, and in so doing, are subject to noise and other distortions described above. It should be noted that this packaging design is representative of many of the cylinder and sphere shapes utilized in the prior art since it is well known that such shapes are more effective in withstanding the high pressures likely to be found in ocean environments.

K.U.M. and SEND offer a cable-less OBS system comprising a frame having a rod at the top and forming a tripod at the bottom. A foam flotation device is attached to the rod. An anchor is fixed to the lower portion of the tripod and secures the frame to the sea floor. Pressure cylinders mounted on the tripod portion of the frame contain seismic recorders, batteries and a release system. A liydrophone is attached to the frame in order to receive command signals from the ocean surface and activate the release system. Also attached to the frame is a pivotally mounted crane arm to which is releasably attached a geophone unit. During deployment, the crane arm is initially maintained in a vertical position with the geophone unit attached to the free end of the arm. When the frame contacts the sea floor, the crane arm pivots out from the frame and releases the geophone unit onto the sea floor approximately 1 meter from the frame system. A hard wire permits electrical communication between the geophone unit and the recorders. The geophone unit itself is an approximately 250 mm diameter, non-symmetrical disk which is flat on one side and domed on the opposite side. The flat side of the geophone unit is grooved and contacts the sea floor when released by the crane arm. Upon completion of data gathering, an acoustic signal activates the release system, which causes the anchor to be detached from the frame system. The foam flotation device causes the frame system and geophone to rise to the ocean surface where the system can be located using the radio beacon and retrieved.

SeaBed Geophysical markets a cable-less OBS system under the name CASE. This system is comprised of a control unit, i.e., electronics package, and a node unit or geophone package connected to each other by a cable. Both the control unit and the node unit are carried on an elongated frame. The control unit is comprised of a tubular body which contains batteries, a clock, a recording unit and a transponder/modem for hydro-acoustic communication with the surface. The node unit is comprised of geophones, a hydrophone, a tilt meter and a replaceable skirt, wherein the skirt forms a downwardly open cylinder under the geophone unit. The node unit is detachable from the elongated frame and control unit, but remains in communication with the control unit via external cabling. The use of a tubular body such as this is very representative of prior art designs because the system packaging must be designed to withstand the high pressures to which the device is exposed. During deployment, the entire unit is dropped to the sea floor, where a remotely operated vehicle (separate from the OBS system) is used to detach the node unit from the frame and plant the node unit into the seafloor, pushing the open-ended skirt into the seafloor sediment. The elongated frame includes a ring to which a deployment and retrieval cable can be attached. The communication transducer and modem are utilized control the system and transmit seismic data to the surface.

Each of the referenced prior art devices embodies one or more of the drawbacks of the prior art. For example, the OBS system of U.S. Pat. No. 5,189,642, as Well as the devices of GeoPro and K.U.M./SEND are upright systems that each have a relatively tall, vertical profile. As such, seismic data collected by these systems is subject to noise arising from water movement acting against the devices. In addition, it has been observed that shear motion caused by movement of the ocean floor under such a tall profile OBS system can cause rocking motion of the OBS system, particularly as the motion translates from the bottom to the top of the unit, further deteriorating-fidelity of the recorded data. Furthermore, these prior art devices are all asymmetrical, such that they can be positioned in only a single orientation. Typically this is achieved by heavily weighting one end of the OBS carriage. However, such a device likely must pass through hundreds of feet of water and contact an often rugged, uneven ocean floor that may be scattered with debris. All of these factors can result in mis-orientation of the system as it settles on the ocean floor, thereby effecting operation of the system. For example, to the extent such a prior art OBS system settles on its side, the geophones will not couple with the ocean floor at all, rendering the device unusable. In addition, incorrect orientation could interfere with the system's release mechanism, jeopardizing recovery of the system.

The tall profile of these prior art systems is also undesirable because such units lend themselves to becoming entangled in fishing lines, shrimping nets, various types of cables or other debris that might be present in the vicinity of the seismic recording activity.

On the other hand, prior art systems that have a smaller profile, such as ocean bottom cables, tend to have poor coupling ability or require external assistance in placement utilizing expensive equipment such as ROVs. For example, the elongated shape of ocean bottom cables results in "good" coupling in only a single orientation, namely along the major axis of the cable. Furthermore, even along the major axis, because of the small surface area of actual contact between the cable and the ocean floor, coupling can be compromised due to a rugged ocean bottom or other obstacles on or near the ocean floor.

Another drawback to these prior art systems is the need to activate and deactivate the units for recording and operation. This generally requires a control signal from the surface vessel, typically either transmitted acoustically or through a cable extending from the surface to the unit. External control of any type is undesirable since it requires signal transmission and additional components in the system. While acoustical transmission can be used for some data transmission, it is generally not reliable to use for synchronization purposes due to unknown travel path variations. Of course, any type of control signal cabling for transmission of electrical signals is undesirable because it adds a level of complexity to the handling and control of the unit and requires external connectors or couplings. Such cabling and connectors are particularly susceptible to leakage and failure in the high pressure, corrosive environment of deep ocean seismic exploration.

A similar problem exists with units that utilize external electrical wiring to interconnect distributed elements of the unit, such as is taught in U.S. Pat. No. 5,189,642 and similar devices where the geophone package is separate from the electronics package. Furthermore, to the extent the electronics of a system are distributed, the likelihood of malfunction of the system increases.

Many of the prior art systems also use radio telemetry rather than recording data on-board the unit, to collect the data. Such systems, of course, have limitations imposed by the characteristics of radio transmission, such as radio spectrum license restrictions, range limitations, line-of-sight obstructions, antenna limitations, data rate limitations, power restrictions, etc.

Those OBS units that utilize flotation devices for retrieval are undesirable because the typical decoupler device adds additional expense and complexity to the units, and generally must be activated in order to release the systems to the surface. In addition, such systems typically discard part of the unit, namely the weighted anchor or skid, leaving it as debris on the ocean floor. During deployment, since they are free-floating, such systems are difficult to position in a desired location on the ocean floor. Notwithstanding the above-mentioned possibility of malfunction due to misorientation, during retrieval, the free-floating systems are often difficult to locate and have been known to be lost-at-sea, despite the presence of radio signals and beacons. Likewise, in tough seas, the units prove unwieldy to snare and lift on board, often colliding with the boom or vessel hull and potentially damaging the system.

In this same vein, handling of the units, both during deployment and retrieval, has proven difficult. To the extent a rigid or semi-rigid cable system is utilized to fix distances and position individual recorder units, such cables are inflexible, extremely heavy and difficult to manipulate. Such cables do not lend themselves to corrections during deployment. For example, as explained above, a desired grid layout identifies specific positions for individual units along a line. If a deployment vessel drifts or otherwise causes a cable being laid to be positioned off of the desired line, the vessel at the surface must reposition to cause the cable to get back on line. However, because of the rigid nature of the cable, the mispositioned portion of the cable will result in all of the remaining units on the cable to be mispositioned along the desired line.

Furthermore, current procedures utilized in the prior art to retrieve cables tends to place undue stress on the cables. Specifically, the widely accepted method for retrieval of a cable line from the ocean floor is to either back down over a line or drive the boat down the line retrieving the cable over the bow of the vessel. This is undesirable because the speed of the vessel and the speed of the cable winch must be carefully regulated so as not to overtension or pull the cable. Such regulation is often difficult because of the various external factors acting on the vessel, such as wind, wave action and water current. Failure to control tensioning or pulling of the cable will have the effect of dragging the entire length of the line, as well as the units attached thereto, subjecting the entire line and all of the units to damage. An additional drawback to this method is that if the vessel is moving too fast, it will cause slack in the cable and the cable will float under the vessel, where it can become entangled in the vessel's propellers.

Finally, nowhere in the prior art is there described a back deck system for handling the above-described OBS units, whether it be storage of the units or deploying and retrieving the units. As the size of deep water seismic recorder arrays become larger, the need for a system for efficiently storing, tracking, servicing and handling the thousands of recorder units comprising such an array becomes more significant. Additional surface vessels are costly, as are the personnel necessary to man such vessels. The presence of additional personnel and vessels also increases the likelihood of accident or injury, especially in open-sea environments where weather can quickly deteriorate.

Thus, it would be desirable to provide a seismic data collection system that does not require external communication/power cabling, either from the surface or on the seismic data collection unit itself, nor any type of external control signal for operation. In other words, the unit should operate on a "drop and forget" basis. Likewise, the device should be easily serviced without the need to open the device to perform activities such as data extraction, quality control and power replenishment. The device should also be designed to withstand the corrosive, high pressure environment common in deep water marine applications. The unit should be configured to minimize the effects of noise arising from ocean currents, and maximize coupling between the device and the ocean floor. In this same vein, the device should be designed to properly orient itself for maximum coupling as the device contacts the ocean floor, without the assistance of external equipment such as ROVs, and minimize the likelihood of misorientation. Likewise, the device should be less susceptible to snaring or entrapment by shrimping nets, fishing lines and the like.

The device should include a timing mechanism that is not susceptible to orientation. Similarly, orientation should not affect gimballing of the geophones.

The device should be easily deployable, yet able to be placed at a certain location with a high degree of confidence. Likewise, the device should be easily retrievable without the need for flotation devices or release mechanisms, nor should parts of the unit be left in the ocean during retrieval. Further, there should be a device and retrieval procedures that minimize potentially damaging tension in the cable connecting the seismic units.

There should also be provided a system for readily handling the hundreds or thousands of recorder units that comprise an array for deployment in ocean environments. Such a system should be able to deploy, retrieve, track, maintain and store individual recorder units while minimizing manpower and the need for additional surface vessels. The system should likewise minimize potential damage to the individual units during such activity. Likewise, it would be desirable to include safety devices in the system to minimize harm to personnel handling the recorder units.

SUMMARY OF THE INVENTION

The present invention provides a system for collecting seismic data in marine environments by deploying multiple, continuous operating, wireless, self-contained ocean bottom sensor units or pods, each characterized by a symmetrical, low profile casing, and a unique external bumper to promote ocean bottom coupling and prevent entrapment in fishing nets. The pods are attached to one another utilizing a flexible, non-rigid, non-conducting cable that is used to control deployment of the pods through the water. The pods are deployed and retrieved from the uniquely configured deck of marine vessel, wherein the deck is provided with a conveyor system and a handling system to attach and detach individual pods from the non-rigid cable. In one embodiment, as part of the deck configuration, the individual pods are randomly stored in juke box fashion in slotted racks. When seated within the slot of a rack, the seismic data previously recorded by the pod can be retrieved and the pod can be charged, tested, re-synchronized, and operation can be re-initiated without the need to open the pod. In another embodiment, the individual pods are stored in stacked, rotating carousels that permit seismic data previously recorded by the pods to be retrieved and the pods to be charged, tested, re-synchronized, and operation can be re-initiated without the need to open the pod. During deployment and retrieval, the non-rigid cable and pods attached thereto are handled so as to minimize the likelihood of tension developing within the deployed line by virtue of movement of the surface vessel. This includes a uniquely configured non-rigid cable system designed to automatically shear apart if a certain level of tension is reached in the cable.

More specifically, each individual sensor unit is comprised of a disk-shaped, water tight case formed of two parallel, circular plates joined around their peripheries by a shallow wall, thereby forming a package which is symmetrical about the axis of the plates and has a very low height profile relative to the diameter of the plates, much in the shape of a wheel. In certain embodiments the plates may be formed in other shapes such as hexagons or octagons which also are capable of forming a symmetrical package. The case is internally supported to protect the integrity of the case from external pressure effects and to provide rigid mechanical coupling between the unit case and the geophones. In one embodiment of the invention, the unit is configured so that it will effectively couple with the ocean floor and collect seismic data whichever plate side it settles on, obviating many of the orientation problems of the prior art. The plates may include ridges, projections or grooves to enhance coupling with the ocean floor.

Disposed around the shallow wall of the unit in one embodiment is a bumper having a cross section shape designed to urge the unit to settle onto one of the plate sides of the package, thereby resulting in a high degree of coupling between the unit and the ocean floor. In at least one embodiment, a bumper is provided and designed to prevent the unit from becoming entangled or snared in shrimping nets or fishing lines.

The unit utilizes several different devices for connecting to a cable. In one embodiment, each unit includes an over-center latching mechanism to permit the units to be attached to a cable. In another embodiment, an attachment bracket is located off-center on the side of the case. In still yet another embodiment, an attachment bracket is centrally located on one of the unit's circular plates forming the case.

The unit is self contained such that all of the electronics are disposed within the case, including a multi-directional geophone package, a seismic data recording device, a power source and a clock.

In one embodiment of the invention, the clock is a rubidium clock. The rubidium clock is much less susceptible to temperature or gravitational effects or orientation of the unit on the ocean floor.

In another embodiment, the unit includes a crystal clock and a tilt meter. Gravitational effects on the crystal clock are preferably corrected on-board the unit in real time utilizing tilt meter data The power source is preferably rechargeable batteries that can operate in a sealed environment, such as lithium ion batteries.

Units incorporating a tilt meter may also utilize the tilt meter data to perform various functions other than crystal clock correction. For example, one aspect of the invention utilizes tilt meter data for mathematical gimballing. Specifically, in the invention, gimballing of the geophones is accomplished mathematically using tilt meter data, and as such, is not subject to the orientation of the unit as are mechanical gimbals.

Of course, tilt meter data may also be used to determine the position of a unit on the ocean floor as is the common use of such data in the prior art. However, unlike the prior art devices, one aspect of the invention is to obtain and utilize tilt meter data in a time continuous fashion. Prior art units typically only determine a unit's position once at the beginning of seismic recording. Yet it has been observed that the position of a unit may change over the course of deployment as the unit is subject to external forces such as water currents, shrimp lines and the like. Thus, in the invention, tilt meter data is measured as a function of time. This is performed multiple times during operation so that seismic data can be corrected as necessary.

With respect to corrections for tilt, timing or similar data that could effect the accuracy of the collected seismic data, all of the prior art devices make such corrections at a processing center. None of the prior art devices make such corrections on-board the unit while it is deployed or even on board the deployment vessel. Thus, one method of the invention is to make such corrections on-board the unit while it is deployed.

The unit may also include a compass, a hydrophone, an acoustical location transducer and/or one or more accelerometers. Compass data may be used to provide frame of reference data for each individual unit relative to the frame of reference for the overall survey. In one embodiment of the invention, sensors such as accelerometers are used to track the position of the unit as it descends through a water column and settles on the ocean floor. Specifically, such sensors provide inertial navigation data and record x, y and z position information as the unit is passing through the water column. This position information, along with initial position and velocity information, is used to determine the eventual location of the unit.

In another aspect of the invention, the unit is activated while on-board the seismic vessel and deactivated once pulled from the ocean, such that it is continuously acquiring data from before the time of deployment to after the time of retrieval. Likewise in one embodiment, the unit begins recording data prior to deployment in the water. Systems that are activated and begin recording before deployment in the water are thereby stabilized prior to the time when signal detection is desired. This minimizes the likelihood that an altered state in electronics operation will disrupt signal detection and recording.

In another aspect of the invention, the seismic data recording device includes wrap around memory and continuously records, even when not in use. This obviates the need for initiation or start instructions, ensures that the unit is stabilized at the desired recording times, and serves to back-up data from prior recordings until such time as the prior data is written over. As long as the clock is synchronized, such a recording device is ready for deployment at any time. Furthermore, routine operations such as data collection, quality control tests and battery charging can take place without interrupting recording. In the case of a continuously recording unit such as this, the unit can be used on land or in a marine environment.

Use of a non-rigid cable is an additional aspect of the invention. While rope may have been used in the very early prior art as a tow line for surface floating seismic devices, heretofore, to the extent OBS systems have been connected to one another, the prior art has utilized only rigid or semi-rigid wire cable. One of the reasons wire cable has been desirable for the prior art OBS systems is the need to electrically interconnect the systems. In the current invention, however, flexible, non-rigid cable is utilized since the pods, as described above, operate independently and do not require external communications or connections.

The non-rigid cable of the invention is preferably formed of a synthetic fiber material, such as polyester, and is encased in a protective overmold, such as a polyurethane casing. In one embodiment, the non-rigid cable is formed of a twelve stranded braided polyester core. The overmold is ribbed or grooved to reduce drag in the water.

The non-rigid cable of the invention is also useful in a unique deployment method for the pods. Specifically, the non-rigid cable has only a slightly negative buoyancy. When attached between two pods each having a negative buoyancy much greater than the cable, as the two jointed pods sink down through a water column, the drag on the non-rigid cable is much greater than the drag on the units and thus acts as a parachute or brake, slowing the descent of the pods and maintaining the pods in an upright position. This is particularly desirable in units that must be placed in a particular orientation, such as those units having non-symmetrical bumper configurations, because the cable, when attached to a centrally mounted connector on the top plate, functions to maintain the orientation of the unit as it passes down through the water column and settles on the ocean floor. Furthermore, since the cable of the invention is non-rigid, there is slack in the cable between adjacent pods. A vessel operator can utilize this slack to make corrections in the drop location while deploying the pods.

Likewise, the non-rigid cable enhances a unique retrieval method of the invention, wherein the cable is retrieved over the stern of the vessel as the vessel "drives down" the cable. In so doing, the drag on the cable created by the water causes the cable to parachute or billow out behind the vessel, minimizing excessive tension on the cable and ensuring that the cable is less likely to become entangled in the vessel's propellers.

On the deck of the seismic vessel, in one embodiment of the invention, a storage system includes a rack having multiple rows and columns of slots is disposed for receipt of the individual units. Each slot includes a communications portal such that when a unit is seated within the slot, the unit interfaces with a master control station via the communications portal. Through the portal, information recorded on the unit can be downloaded, the unit batteries can be recharged, quality control checks on the unit can be conducted, recording can be re-initiated and the unit can be reactivated. In another embodiment of the invention, a storage system includes stacked, u-shaped carousels. Each carousel includes rollers to permit the recording units to be moved along the path of the carousel in conveyor type fashion until the units are positioned adjacent a communications portal. Whichever storage system is utilized, the storage systems may be configured to have the dimensions of a standard 8'×20'×8' shipping container so that the storage systems and any seismic units stored therein, can be easily transported utilizing standard container ships.

Each unit may include a unique identification means, such as a radio frequency identification (RFID) tag or similar identification indicia to permit tracking of the individual units as they are handled on the deck. Likewise, as mentioned above, each unit may include an acoustical location transducer or accelerometers to determine a unit's location on the ocean floor. Since the individual units are self contained, the location information, in association with the identification indicia allows the units to be randomly inserted into the storage rack, but permits data from multiple units to be retrieved and sequentially ordered according to the previous location of the unit on the ocean floor. Thus, the need to keep units in sequential order is obviated. Units that might have been adjacent one another on a receiver line need not be stored next to one another in the racks.

In addition, the overall deployment and retrieval system for the units is substantially automated on the deck. The deck configuration includes a conveyor system running adjacent the racks and extending to the edge of the deck adjacent the water. A robotic arm is positioned for moving the units between the storage rack and the conveyor belt. In one embodiment, a cable engine and cable spool/container are positioned to pay out non-rigid cable so as to run adjacent the conveyor system and over the side of the vessel. As units are placed on the conveyor system for attachment to the non-rigid cable, the speed of the conveyor is adjusted to match the speed of the cable, permitting attachment of the units on-the-fly. Furthermore, those skilled in the art will understand that the payout speed of line is not constant since movement of the vessel through the water is not constant, even under calm seas and low wind conditions.

In another embodiment of the invention, the conveyor intersects with the cable being paid out by the cable engine. At the intersection, a seismic unit is attached to the cable and the attached unit is subsequently released into the water. A cable grabber downstream from the attachment station is used to securely clamp the cable prior to attachment of a unit, thereby removing upstream line tension during attachment of the unit to the cable. The cable grabber may include a release system requiring an operator to use both hands in order to open the grabber, thereby minimizing danger to the operator when the unit is released and the upstream cable is again placed under tension.

With respect to tension in the cable, the cable is sectioned and the cable sections are attached to one another utilizing a uniquely designed, break-away connector. The connector is comprised of first and second fittings that nest into each other. A shear pin is inserted through the nested fittings to secure the fitting together. Each fitting is attached to the end of a cable section such that when the fittings are secured together, the cable sections form a longer length of cable. If the tension in the cable become greater than the shear limit of the shear pin, the shear pin with break away and the cable will separate.

Furthermore, while one embodiment of the invention utilizes a clamping mechanism that permits units to be clamped directly on a length of cable, another embodiment of the invention utilizes a sleeve attached to the cable. The clamping mechanism secures to the sleeve which is bounded by overmolded shoulders. Rather than attaching shoulders between adjacent lengths of cable as is common in the prior art, the sleeve of the invention can be clamped or placed around a length of cable and secured in place without cutting the cable. In the embodiment, the sleeve is secured to the cable by inserting pins through the sleeve and cable in the x and y planes perpendicular to the axis of the cable. Shoulders are molded over the pins at the ends of each sleeve. While the overmolding on opposite ends of the sleeve can be used to define an attachment area along the sleeve, the sleeve may include flared ends that further define such attachment area.

In one aspect, a method is disclosed of performing a seismic survey including: deploying nodal seismic sensors at positions in a survey region; activating a plurality of seismic sources; and using the nodal seismic sensors to record seismic signals generated in response to the activation of the plurality of signals.

In some embodiments, at least some of the nodal seismic sensors record blended seismic signals.

In some embodiments, the step of activating a plurality of seismic sources includes repeatedly activating at least two of the seismic sources at times separated by a variable dither time.

In some embodiments, the dither time varies randomly or pseudo-randomly.

In some embodiments, at least some of the nodes are configured to continuously record seismic signals to generate seismic data during the step of repeatedly activating at least two of the seismic sources.

Some embodiments include retrieving the continuously recorded seismic data acquired during the step of repeatedly activating at least two of the seismic sources; and processing the retrieved data to generate seismic gather data indicative of at least one common receiver gather.

Some embodiments include de-blending the seismic gather data.

In some embodiments, de-blending the seismic gather data includes enhancing data corresponding to activation of a first one of the seismic sources while diminishing data corresponding to activation of another one of the seismic sources.

In some embodiments, enhancing data corresponding to activation of the first one of the seismic sources includes coherently combining data corresponding to multiple activations of the first one of the seismic sources using coherent data from at least a portion of the plurality of sensor nodes.

In some embodiments, diminishing data corresponding to activation of the second one of the seismic sources includes incoherently combining data corresponding to multiple activations of the second one of the seismic sources using incoherent data from at least a portion of the plurality of sensor nodes.

In some embodiments, at least a portion of the nodal seismic sensors includes ocean bottom sensors.

Some embodiments include comprising deploying at least some of the ocean bottom sensors using a remotely operated vehicle.

Some embodiments include deploying at least some of the ocean bottom sensors using a node-on-a-rope system.

In some embodiments the nodal seismic sensors are synchronized to standard time at the time they deployed.

In some embodiments, the nodal seismic sensors are synchronized to standard time at the time they are recovered.

In some embodiments, the nodal seismic sensors are synchronized to standard time at the time they while they are deployed.

In some embodiments, at least one of the nodal seismic sensors include a GPS receiver used to synchronize the sensor to standard time at the time they while the sensor is deployed.

In some embodiments, at least some of the nodal seismic sensors are deployed in a marine environment at a depth greater than 100 m, 500 m, 1000 m.

In some embodiments, at least some of the nodal seismic sensors continuously record seismic data during deployment.

In some embodiments, activating a plurality of seismic sources includes: obtaining a plurality of marine vessels, each vessel configured to transport at least one of the plurality of seismic sources; and using the marine vessels to activate the seismic sources at a plurality of selected location.

In some embodiments, at least one of the nodal seismic sensors includes: a case; at least one seismic sensor disposed within the case; a clock disposed within said case; a power source disposed within the case; and a seismic data recorder disposed within the case.

In some embodiments, the at least one seismic sensor includes a geophone, hydrophone, accelerometer, or combinations thereof.

In some embodiments, at least one seismic source includes at least one air gun.

In some embodiments, at least one of seismic source includes at least one selected from the list consisting of: a weight drop device; a seismic vibrator device; and an explosive source.

In some embodiments, the step of activating a plurality of seismic sources includes modulating an output of each seismic source with a respective modulation signature indicative of the identity of the seismic source.

Some embodiment include using the record seismic signals to generate survey data indicative of subsurface geological features in the survey region.

Some embodiments include outputting the survey data.

Various embodiments may include any of the above described elements, either alone or in any suitable combination.

BRIEF DESCRIPTION OF THE DRAWINGS

FIG. 6 is a back side view of the unit with a cross-section of a wedge bumper.

FIG. 7 is a top view of the unit with the wedge bumper of FIG. 6.

FIG. 8 is elevated view of the unit with a hinged flipper.

DETAILED DESCRIPTION OF THE PREFERRED EMBODIMENTS

In the detailed description of the invention, like numerals are employed to designate like parts throughout, various items of equipment, such as fasteners, fittings, etc., may be omitted to simplify the description. However, those skilled in the art will realize that such conventional equipment can be employed as desired.

Figure 1:
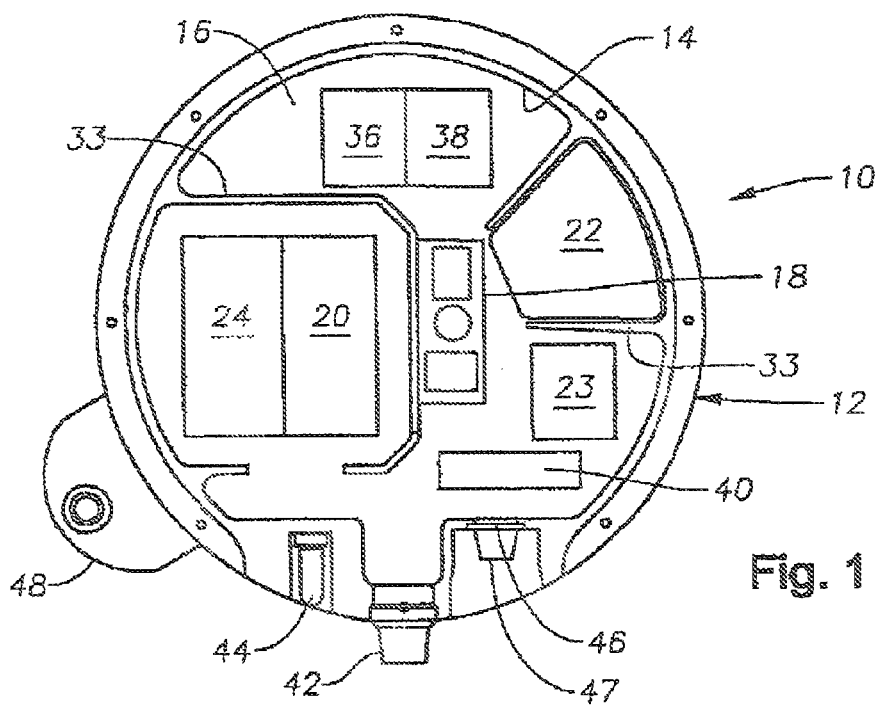
FIG. 1 is a cut-away top view of the seismic recorder unit of the current invention.

With reference to FIG. 1, there is shown a seismic data collection system or pod 10 of the invention. Pod 10 is comprised of a water tight case 12 having a wall 14 defining an internal, water-tight compartment 16. Disposed within compartment 16 is at least one geophone 18, a clock 20, a power source 22, a control mechanism 23 and a seismic data recorder 24. In the embodiment, pod 10 is self-contained such that power source 22 meets all of the power requirements of pod 10. Likewise, control mechanism 23 provides all control functions for pod 10 eliminating the need for external control communications. Pod 10 is weighted to have a negative buoyancy so that it will sink towards the ocean floor when deployed in a water column.

Those skilled in the art will appreciate that pod 10 is a self-contained seismic data collection system which requires no external communication or control in order to record seismic signals. It will be further noted that geophone 18 is internally mounted within pod 10 and thus requires no external wiring or connection. It has been determined that utilizing the case design described in more detail below, geophone 18 is effectively coupled to the ocean floor such that seismic data transmitted through pod 10 to geophone 18 is not corrupted by interference.

While the basic elements have been described above, pod 10 may also include a compass 36 and a tilt meter 38. Furthermore, in the preferred embodiment, geophone 18 is a geophone package comprised of three geophones to detect seismic waves in each of the x, y and z axes. Unless specifically indicated, all references to geophones utilized in the invention include conventional geophones as well as other known devices for detecting seismic wave activity, including without limitation, accelerometers.

In another embodiment of the invention, it has been found advantageous to utilize four geophones positioned in a tetrahedral configuration such that each geophone measures data in multiple planes. In a standard three dimensions configuration, three geophones are positioned 90° apart from each other and each geophone measures signal in a single x, y or z plane. In a four geophone configuration, the geophones are oriented perpendicular to the plane of the tetrahedral faces so that each geophone measures portions of multiple planes in the x, y, z coordinate system. For example, one geophone may measure seismic data in the x-plane and z-plane. Geophone configurations of four or more geophones are desirable because they provide for redundancy in the seismic unit in the event of failure of a geophone in a particular plane. None of the prior art OBS systems have utilized four or more geophones to detect seismic data in the manner.

In one important aspect of the invention, clock 20 is a rubidium clock. Heretofore, rubidium clocks have not been used in seismic exploration due in part to the expense when compared to traditional crystal driven clocks. However, because the pod 10 of the invention is intended to operate most effectively in one of several orientations, it is necessary to utilize a clock that in not susceptible to orientation effects which can inhibit operation of traditional prior art crystal clocks. Furthermore, rubidium clocks are less susceptible to temperature and gravitational effects that can inhibit operation of prior art clocks in ocean environments.

Power source 22 is preferably a lithium ion battery. To the extent prior art OBS systems have utilized on-board batteries, as opposed to external cabling to supply power, the prior art batteries have been lead-acid, alkaline or non-rechargeable batteries.

None of the prior art OBS systems have utilized lithium ion batteries. However, because of the sealed, self-contained nature of the pod of the invention, it is desirable to utilize a battery, such as the lithium ion type, that does not vent fumes and are easily rechargeable.

Figure 2:
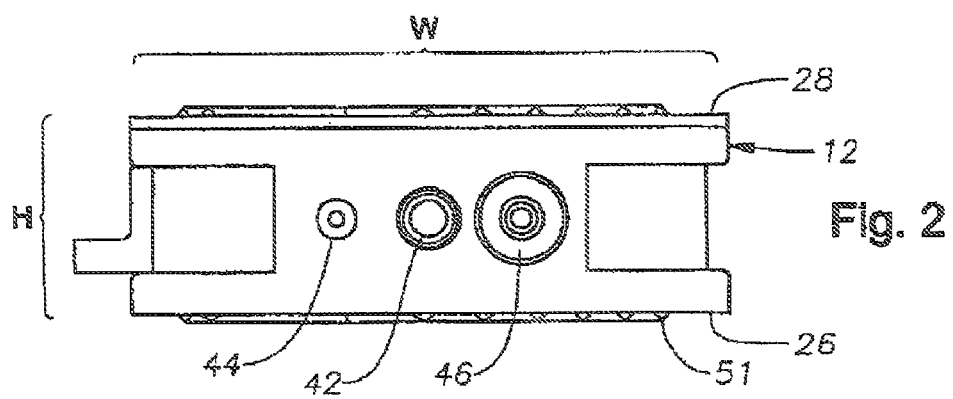
FIG. 2 is a front side view of the unit of FIG. 1.
Figure 3:
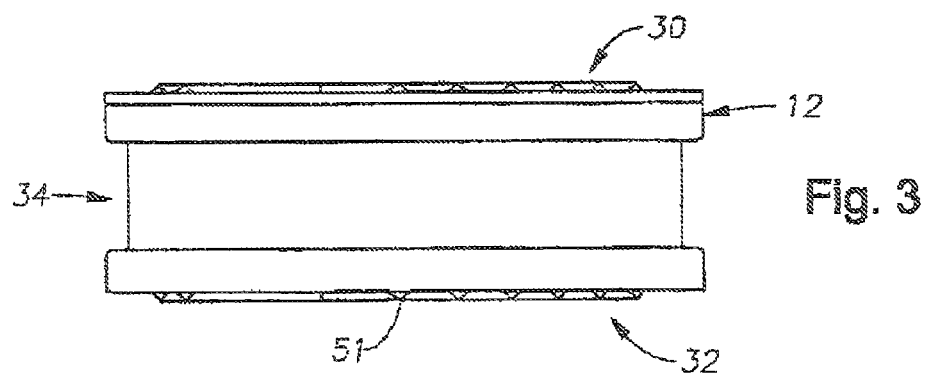
FIG. 3 is a back side view of the unit of FIG. 1.

In FIGS. 2 and 3, one of the unique features of pod 10 can be appreciated, namely the low profile configuration of pod 10. Specifically, case 12 comprises a first plate 26 and a second plate 28 jointed together along their peripheries by wall 14. In one embodiment plates 26 and 28 are disk shaped, such that the overall shape of case 12 is that of a wheel. In any event, as can be appreciated, each plate 26, 28 is characterized by a width (W) and wall 14 is characterized by a height (H), wherein the width W of plates 26, 28 is greater than the height of the wall. Of course, to the extent plates 26, 28 are disk shaped, then any references to width W should be replaced by a diameter D. However, for purposes of the low profile description, whether case 12 is circular in shape and characterized by a diameter D or otherwise characterized by a height H, the low profile characteristic is the same. While not limiting the overall low profile, in one embodiment, the height H is no more than 50% of the width W or diameter D. In one non-limiting example, the height H of pod 10 is approximately 6.5 inches and the width/diameter of pod 10 is approximately 18.5 inches.

As shown in the drawings, the pod 10 is substantially externally symmetrical about its x and y axes, such that, when deployed, pod 10 can settle on either side 30, 32 and still effectively couple to the ocean bottom. Thus, the orientation of pod 10 becomes much less of a concern as compared to prior art OBS systems designed to settle on the bottom in only one "upright" position. Furthermore, because of the narrow profile of pod 10, its balance is generally unstable on edge 34. Thus, to the extent pod 10 touches down on the ocean bottom on edge 34, the pod 10 will tip over and settle on one of the two faces 30, 32.

Pod 10 also includes internal ribbing 33 used to support plates 26, 28 as pod 10 is subjected to the high pressures characteristic of an ocean environment. Ribbing 33 prevents any "rattle" or movement of plates 26, 28 that could otherwise interfere with seismic wave detection. Unlike the prior art, pod 10 as described herein is effectively a casing for the geophones such that a seismic wave can pass undistorted through the pod's plate to geophone 18. In this regard, because of the low profile and rigid nature of pod 10, the attachment point of geophone 18 within case 12 becomes of less consequence and the problems associated with prior art designs are overcome.

Each unit may include a unique identification means, such as a radio frequency identification (RFID) tag 40 or similar identification indicia to permit tracking of the individual units as they are handled on the deck in the manner described below. Likewise, each unit may include an acoustical location transducer 42 which permits the unit's location on the ocean floor to be determined.

FIG. 1 also shows a hydrophone 44 to permit measurement of pressure and a connector 46 for permitting communication with pod 10 When pod 10 is on deck or otherwise disposed in a rack as described below. Connector 46 may be a standard pin connector or may be an infrared or similar connector that requires no hard wiring in order to communicate with pod 10. Via connector 46, pod 10 may be serviced without removing one of plates 26, 28 or otherwise opening case 12. Specifically, connector 46 permits quality control tests to be run, recorded seismic data to be extracted, clock 20 to be synchronized and power source 22 to be recharged, Because connector 46 is only utilized above the water, a water tight, pressure resistant connector cap 47 may also be provided to protect connector 46. Utilizing such a connector cap 47, connector 46 may be any standard connector that satisfies the desired functions of the pod. Connector 46 need not be of the type normally required of external connectors subjected to high pressure, corrosive environments.

Finally, shown in FIG. 1 is an optional attachment bracket 48 for clamping or otherwise grasping and manipulating pod 10. Bracket 48 is positioned on case 12 so that the radial angle between bracket 48 and any hardware that may be extending from pod 10, such as transducer 42 or hydrophone 44 is obtuse or acute. In the embodiment shown, the angle is acute. Specifically, it is common that upon deployment or retrieval of devices such as pod 10, such devices may bang against the side of the ship or other equipment as the pods are manipulated, potentially damaging hardware that protrudes from the devices. By positioning bracket 48 on the periphery of case 12 so that the radial axis extending from the center of case 12 through bracket 48 is less than 90° separated from the radial axis extending from the center of case 12 through transducer 42, the likelihood of damage to this hardware is diminished.

In one embodiment of the invention, rather than incorporating an attachment bracket 48, a latching mechanism is attached to wall 14, again, preferably, in an position to minimize damage to equipment protruding from pod 10. One effective latching mechanism is an over-center latching mechanism having opposing jaws that can be opened and closed to permit the units to be attached to a cable for deployment. The latching mechanism may further be attached askew to wall 14 so that the major axis of the latching mechanism and the z-axis of the pod 10 do not intersect. Again, such an orientation further protects hardware protruding from pod 10.

Figure 4:
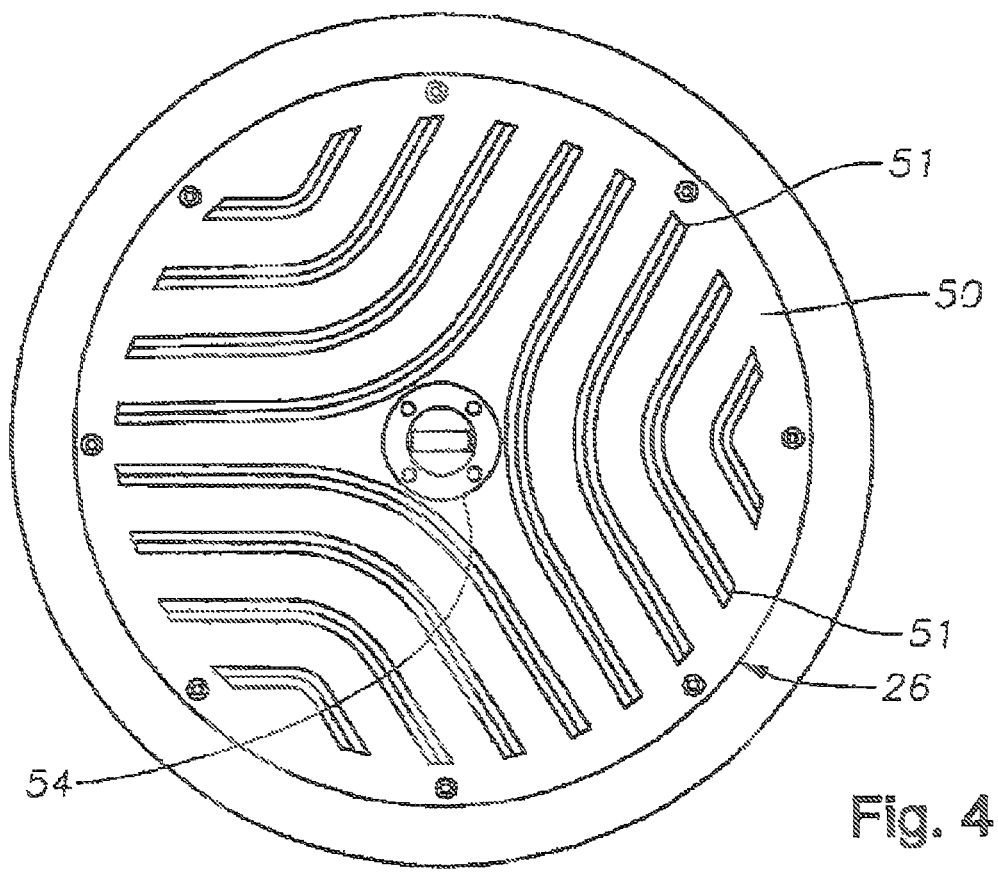
FIG. 4 is a top view of the unit of FIG. 1.

In FIG. 4, the external surface 50 of one or both of plates 26, 28 is illustrated. Specifically, surface 50 may be provided with projections 51, such as ridges or grooves, to enhance coupling between pod 10 and the ocean floor. In the embodiment shown, the projections 51 form a chevron pattern on surface 50.

Figure 5:
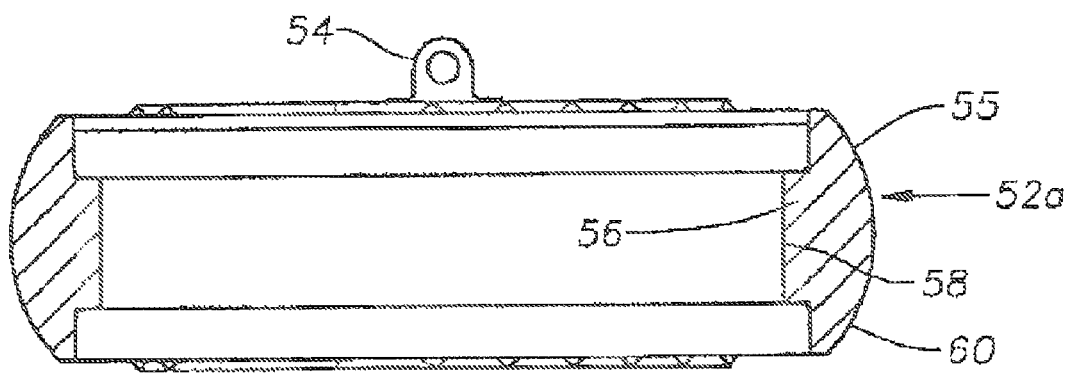
FIG. 5 is a back side view of the unit with a cross-section of the rounded bumper.

Also shown on FIGS. 4 and 5 is an attachment bracket 54 which may be incorporated for clamping or otherwise grasping and manipulating pod 10 so that plates 26, 28 remain substantially horizontal as pod 10 is lowered through a water column by a cable attached bracket 54. As such, bracket 54 may be axially centered on one of plates 26, 28 or otherwise positioned on one of plates 26, 28 above the center of gravity of pod 10.

Turning to FIGS. 4-8, one of the aspects of the invention is the incorporation of a bumper, generally numbered as bumper 52, around the pod 10. FIGS. 4-8 illustrate three different configurations of bumper 52, wherein the configurations are referred to as bumper 52a, bumper 52b and bumper 52c. In any event, bumper 52 has several functions. First, it may be shaped to urge pod 10 onto one of the two faces 30, 32 when pod 10 touches down on the ocean bottom on edge 34. Bumper 52 also functions to protect pod 10 and any external devices, such as transducer 42, which may be protruding from case 12. Finally, the bumper may be of a shape that inhibits pod 10 from becoming entangled by shrimping nets and shrimping drag or "tickle" chains. In any case, bumper 52 may serve some or all of these functions.

As stated above, bumper 52 may have several designs. In FIG. 5, bumper 52a is shown in cut-away disposed around case 12, while in FIG. 4, a bumper 52a is seen in a top view of pod 10. Specifically, bumper 52a is shown as having a rounded or curved cross section 55. As shown, bumper 52a includes a shoulder 56 which fits into a groove 58 defined around the periphery of case 12. A portion 60 of bumper 52a extends beyond the periphery of case 12, thereby protecting edge 34 of case 12. Due to the rounded nature of the bumper 52a, pod 10 will roll or tilt onto a coupling surface of plates 26, 28 if pod 10 begins to settle on the ocean floor so that plates 26, 28 are perpendicular with the ocean floor. Furthermore, bumper 52a will function to protect pod 10 from shock and to protect personnel during handling of pod 10.

An alternate bumper profile is shown in FIGS. 6 and 7 in which bumper 52b has a wedge-shaped cross-section 62. Again, bumper 52b includes a shoulder 56 which fits into a groove 58 defined around the periphery of case 12. A portion 64 of bumper 52b extends beyond the periphery of case 12, thereby protecting plates 26, 28 and edge 34 of case 12. The bumper 52b illustrated in FIGS. 6 and 7 also includes cavities 66 which can be utilized as handholds for grasping and manipulating pod 10. In the embodiment of 52b, it can be appreciated that it is desirable to orient pod 10 having bumper 52b on the ocean floor so that the wedge of bumper 52b faces down. Thus, for this embodiment, plate 28 is considered the top of pod 10 and plate 26 is considered the bottom of pod 10.

In the bumper 52b embodiment of FIGS. 6 and 7, an additional bumper portion 68 is shown mounted on top plate 28, bumper portion 68 has a rounded cross-section 70 that transitions into wedge-shaped cross-section 62. In one embodiment, glass beads may molded or otherwise incorporated into bumper portion 68 to increase the buoyancy of bumper portion 68. By increasing the buoyancy at the top of pod 10, this insures that pod 10 will be properly oriented, i.e., so that wedge shaped bumper 52b faces down, as pod 10 passes through a water column and settles on the ocean floor.

To the extent a chain or other line is pulled against pod 10 when it is coupled to the ocean floor, the chain will simply slide along the wedge-shaped surface of bumper 52b and up over the top of pod 10. Bumper portion 68 further prevents such a chain or line from snagging or catching on any equipment which may be protruding from the upward-facing plate surface of pod 10.

Still yet another embodiment of bumper 52 is illustrated in FIG. 8 in which bumper 52c is comprised of a flipper or wedge 72 having a narrow end 74 and a wide end 76. Wide end 76 is fitted and hinged between two brackets 78 attached to wall 14 of case 12. Preferably, brackets 78 are shaped so that their out edge 80 forms a substantially smooth transition surface with the surface of wedge 72. During deployment, pod 10 can settle on either surface 26, 28 and the hinged wedge 72 will flap down against the ocean floor, forming a ramp or skirt over which a shrimper chain or similar line will ride when pulled against pod 10. In this way bumper 52c will urge the chain over the top of pod 10 preventing the chain from snagging or catching pod 10.

One function of the seismic data recording unit of the invention is the continuous operation of the unit. In this aspect of the invention, data acquisition is initiated prior to positioning of the unit on the earth's surface. In one preferred embodiment, a marine seismic unit is activated and begins acquiring data prior to deployment in the water. Systems that are activated and begin acquiring data prior to deployment are thereby stabilized prior to the time when signal detection is desired. This minimizes the likelihood that an altered state in electronics operation will disrupt signal detection. Of course, in the case of a continuous data acquisition unit such as this, the novelty lies in the "continuous" nature of the unit and such function is applicable whether on land or in a marine environment.

In a similar embodiment, data recording is initiated prior to positioning along a receiver line. For example, a marine seismic data recording unit is activated while still on the deployment vessel and begins acquiring data prior to deployment in the water. Again, this permits units to stabilize prior to the time signal recording is desired. To this end, one component of system stabilization is clock stabilization. Of the various components of the system, it is well known that clocks typically take a long time to stabilize. Thus, in one embodiment of the invention, whether the unit is continuously detecting data or continuously recording data, the clock always remains on.

In either of the preceding two methods, the unit can be utilized in several cycles of deployment and retrieval without interrupting the continuous operation of the unit. Thus, for example, prior to deployment, recording is initiated. The device is deployed, retrieved and redeployed, all while recording is continued. As long as memory is sufficient, this continuous recording during multiple cycles of deployment and redeployment can be maintained.

In this regard, to the extent the seismic data unit includes wrap around memory, it can continuously record even when not in use in seismic detection. Thus, in addition to the advantages described above, initiation or start instructions become unnecessary. Further, continuous recording utilizing wrap around memory functions as a back-up for data acquired from prior recordings until such time as the prior data is written over. An additional advantage is that the device is ready for deployment at any time as long as the clock is synchronized.

To the extent recording is continued after a unit has been retrieved, routine operations such as data collection, quality control tests and battery charging can take place without interrupting recording. One benefit of such a system is that the device can be utilized to record quality control test data rather than seismic data when conducting quality control tests. In other words, the data input changes from seismic data to quality control data. Once quality control is complete, the device may resume recording seismic data or other desired data, such as data related to position and timing.

In one preferred embodiment of the invention, a marine seismic unit includes an inertial navigation system to measure the unit's x, y and z position information as the unit is passing through the water column and settles on the ocean floor. Generally, such a system measures movement in each of the x, y and z dimensions as well as angular movement around each x, y and z axis. In other words, the system measures the six degrees of freedom of the unit as it travels from the vessel to the ocean floor, and utilizes such measurement information to determine location on the ocean floor. In the preferred embodiment, such x, y and z dimensional information can be determined utilizing accelerometers. Angular orientation, i.e., tilt and direction, information can be determined utilizing a tilt meter and a compass or other orientation devices, such as gyroscopes. In one embodiment of the invention, three accelerometers and three gyroscopes are utilized to generate the inertial navigation data used to determine the unit's ocean floor position.

In any event, by combining accelerometer and the tilt and direction information as a function of time with the unit's initial position and velocity at the time it is discharged into the water column, the travel path of the unit through the water column can be determined. More importantly, the location of the unit at the bottom of the water column, i.e., the location of the unit on the ocean floor, can be determined. Time sampling will occur at appropriate intervals to yield the accuracy needed. Time sampling between various measurement components may vary. For example, data from the compass, used to measure direction, and the tilt meter, used to measure tilt, may be, sampled more slowly than data from the accelerometers. Heretofore, no other marine seismic unit has utilized one or more accelerometers to determine location in this way. In this regard, the method and system replaces the need to determine ocean floor location utilizing other techniques, such as through acoustical location transducers or the like.

Notwithstanding the foregoing, this position determination method functions particularly well with the above described continuous recording method. Because a unit is already recording data as it is discharged into the top of the water column, x, y and z positional information is easily recorded on the unit and becomes part of the unit's complete data record.

Figure 9:
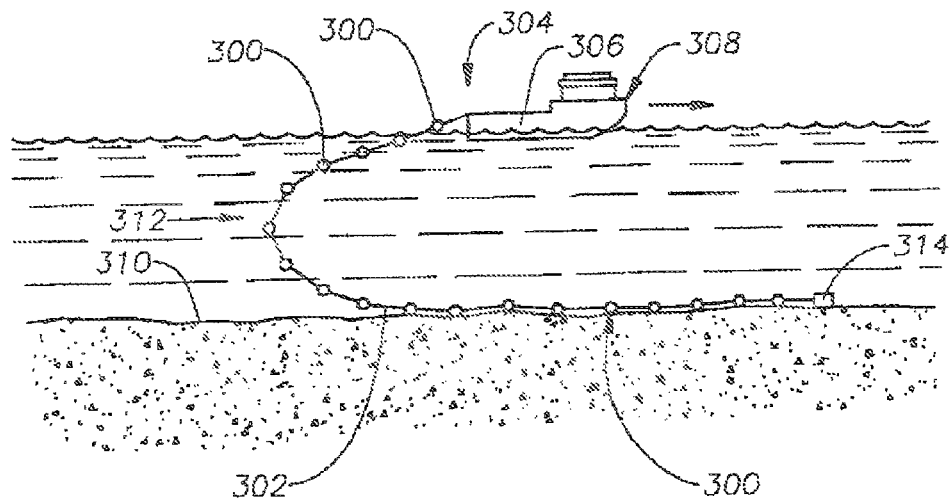
FIG. 9 illustrates an over-the-stem pod retrieval method.

The invention also provides for a unique retrieval method for OBS units 300 attached to a cable 302, as illustrated in FIG. 9. Specifically, it has been found that retrieving cable 302 over the trailing end 304 (generally the stern) of a vessel 306 as the vessel moves leading end 30S (often the vessel bow) first down a cable 302 in the direction of the cable minimizes dragging of the cable on the ocean floor 310 as the cable 302 is taken up and prevents undue tension or "pulling" of the cable 302 common in the prior art retrieval technique. Specifically, the water drag on the OBS units and cable in the method of the invention causes the cable 302 to parachute or billow out behind vessel 306, as shown at 312, utilizing the water column as a shock absorber and minimizing undue tension.

In this method, regulation of the speed of the vessel 306 is not as critical as in the prior art over-the-bow retrieval method. Furthermore, because the cable 302 is billowed out 312 in the water behind the vessel as the vessel moves in the opposite direction from the billow, the cable is less likely to become entangled in the vessel's propellers as may occur using the prior art method. Of course, those skilled in the art will understand that in the method of the invention, cable can be taken up over the bow or the stern of the vessel as long as the vessel is moving in a direction along the cable and the cable is being taken up by the trailing end of the vessel.

In any event, a flotation release system 314 may also be attached to the cable, generally at one or both ends of the deployed cable, to cause at least a portion of the cable to rise to the surface where it can be easily snagged for retrieval utilizing the above described method. Such a system is well known in the art and may include a flotation device that is released from near the ocean floor at the desired time of retrieval or a flotation device that floats on the water surface but remains attached to the cable while deployed.

Figure 10:
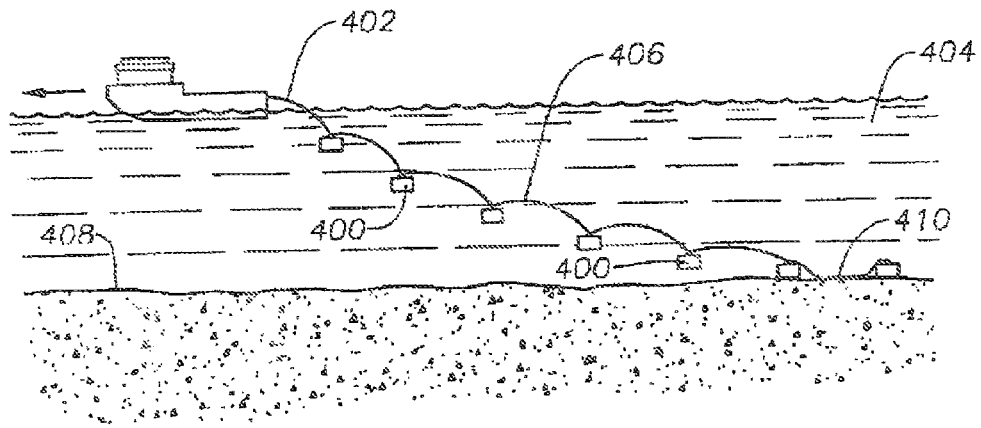
FIG. 10 illustrates multiple units attached to a non-rigid line during deployment.

The non-rigid cable of the invention is also incorporated in a unique deployment method for the pods, as illustrated in FIG. 10. Specifically, at least two OBS units 400 are tethered together using a non-rigid cable 402. The cable 402 and units 400 are deployed into a water column 404. Because the units 400 are of a much greater negative buoyancy than the nonrigid cable 402, the units will have a tendency to sink through the water column ahead of the cable such that the cable segment adjoining two units parachutes between the two units as shown at 406, The drag of the cable down through the water column functions as a break, slowing the descent of the units and permitting the placement of the units on the ocean floor 408 to be more readily controlled. Specifically, the parachuting effect permits control of the orientation of units such as those outfitted with the wedge shaped bumper illustrated in FIGS. 6 and 7. Furthermore, the non-rigid cable cause the unit to gently settle on the ocean floor, allowing for consistent coupling of the units to the ocean floor.

This is an improvement over the prior art methods because the prior art methods utilize a rigid or semi-rigid cable for deployment of OBS units. Such cable has a tendency to sink quickly through the water column along with the units. In other words, such cables do not have the same drag characteristics as the lighter weight, non-rigid cable of the invention. In cable and OBS units utilizing this prior art method, the orientation of individual units is much more likely to destabilize, e.g., wobble off course or flip over, as the unit quickly passes through the water column.

An additional benefit to the deployment method of the invention is that the non-rigid cable permits slack to form between adjacent units, both during deployment and once settled on the ocean floor. In fact, it has been found that during general deployment operations such as described above, the length of the non-rigid cable between two units will generally be much greater than the actual spacing between the units once resting on the ocean floor. In other words, once settled on the ocean floor, there may be a great deal of slack in the non-rigid cable between adjacent units. For this reason, the non-rigid cable of the invention is not utilized to space units apart from one another. In any event, a vessel operator can utilize the slack that forms in the non-rigid cable to cause correction to a receiver line as it is being laid. Specifically, if a deployment vessel drifts or otherwise causes a receiver line being laid to be positioned off of the desired receiver line, the vessel at the surface can reposition to cause the remainder of the non-rigid cable and attached units to begin settling back on the desired receiver line. The slack in the cable resulting from the non-rigid nature of the cable permits the operator to get back on line and cause the remainder of the individual units to settle in approximately their desired location along the intended line, In contrast, if such units were attached to a rigid or semi-rigid cable, the cable would not have any adjustment slack and the remainder of the units, while perhaps positioned along the desired receiver line, would not be positioned in the desired location along the receiver line. Furthermore, once the units 400 are in position on the ocean floor, the cable 402 between them is slack, as shown at 410. This "decouples" individual units from one another and prevents strumming or transmission of undesired noise along the cable.

To the extent clock 20 is a crystal clock, information from the tilt meter 38 may be used to correct for gravitational effects on clock timing. In the prior art, tilt meter information has only been used to correct seismic data. Other than crystal clock corrections to account for temperature effects, no other type of crystal corrections have been made to such clocks. Thus, one aspect of the invention utilizes tilt meter information to correct inaccuracies in the clock timing arising from gravitational effects acting on the crystal clock. Such clock correction can be carried out on-board the pod at or near the time of data recording, or applied to the data once the data has been extracted from the pod.

Likewise, information from the tilt meter 38 can be used to apply mathematical gimballing to the seismic data. To the extent seismic data has been corrected in the prior art to adjust for orientation, such correction has been based on mechanical gimbals installed on board the prior art OBS systems. However, a typical mechanical gimbal can cause deterioration in the data fidelity due to dampening of the gimbal in its carriage. In one aspect of the invention, it has been determined that a non-gimballed, mathematical correction, or "mathematical gimballing" is desirable over the gimballing methods of the prior art. Thus, the invention may utilize tilt meter information to mathematically adjust the seismic data to account for vertical orientation of the pod. Such mathematical gimballing can he carried out on-board the pod at or near the time of data recording, or may be applied to data once it has been extracted from the pod.

In addition, information from compass 36 can be used to further refine the mathematical gimballing to account for rotational orientation of the unit. Specifically, compass data can be incorporated with the tilt meter data in mathematical gimballing to more fully correct seismic data for effects arising from orientation of a pod.

Simultaneous Shooting with Nodal Acquisition

In some embodiments, seismic surveys may be performed using seismometer packages ("pods," "nodes"), e.g., of the type described herein, to record seismic signals generated in response to multiple seismic sources. For example, as discussed in greater detail below, ocean bottom sensor nodes may be used to record seismic signals generated in response to repeated activation of multiple seismic sources, e.g., air gun sources towed by multiple vessels, at selected times and locations. These activations are sometimes referred to as "shots". The ocean bottom sensor nodes are deployed at selected locations, and may be used to continuously record seismic data during the activation of the multiple sources, with the nodes later retrieved, and the seismic data extracted for processing.

The use of multiple sources may be advantageous, e.g., in allowing for a survey plan with a given number of shot points to be completed in less time than would be possible using a single source. However, the use of multiple sources may lead to complications in data processing. For example, a given sensor node may receive seismic energy originating from multiple sources at the same time, resulting in "blended" data. Accordingly, a survey where this occurs may be referred to as a "simultaneous shooting" survey. Note that while the term "simultaneous shooting" is used to discuss this approach to seismic surveying, in practice the shots tend to be only substantially simultaneous, but may be generally (e.g., as described in greater detail below) not precisely simultaneous. In the context of this application, shots from different sources that are substantially simultaneous are fired closely enough together in time that at least one node being used in the seismic survey to collect seismic data will receive a signal that for at least some period of time represents seismic data caused by both of the shots. Such a signal may be referred to as a "blended seismic signal."

In some cases, blended data recorded in response to a blended seismic signal may be unsuitable, e.g., when using processing techniques developed under the assumption of a single source (as is the case with many conventional seismic processing techniques).

Accordingly, in some embodiments, the seismic survey may be conducted in a manner that allows for the data to be processed to separate out signal from each of multiple sources, a process referred to generally as "deblending". For example, in some embodiments, the relation in time between shots may be varied (e.g., randomly, pseudo-randomly, or with a selected timing function). This timing relationship may then be used to deblend the recorded seismic signal. For example, as explained in greater detail below, when this type of timing relationship is provided, combining data from multiple shots for a given receiver may cause the seismic signal from one source to combine coherently (thereby enhancing the signal from this source in the combined data), while causing the seismic signal from another source or sources to combine incoherently (thereby diminishing the signal from this source in the combined data). In some embodiments, the signal from the other sources may be reduced by, e.g., 50%, 75%, 90%, 95%, 99% or more. In some embodiments, this allows the data to be substantially or completely deblended, thereby allowing the data to undergo further processing using techniques designed for non-blended seismic data.

As mentioned above, "simultaneous shooting" may allow for significant reduction in acquisition time for a seismic survey. In a case where two sources are used, the time required to perform the survey may be reduced dramatically, on the order of a 50% reduction in time required. If more than two sources are used, the required time may be reduced even further.

Similarly, when a seismic survey is to be performed within a set amount of time, a greater amount of data may be gathered for a particular area, or a greater area may be surveyed due to the efficiencies realized with using multiple sources.

Figure 11:
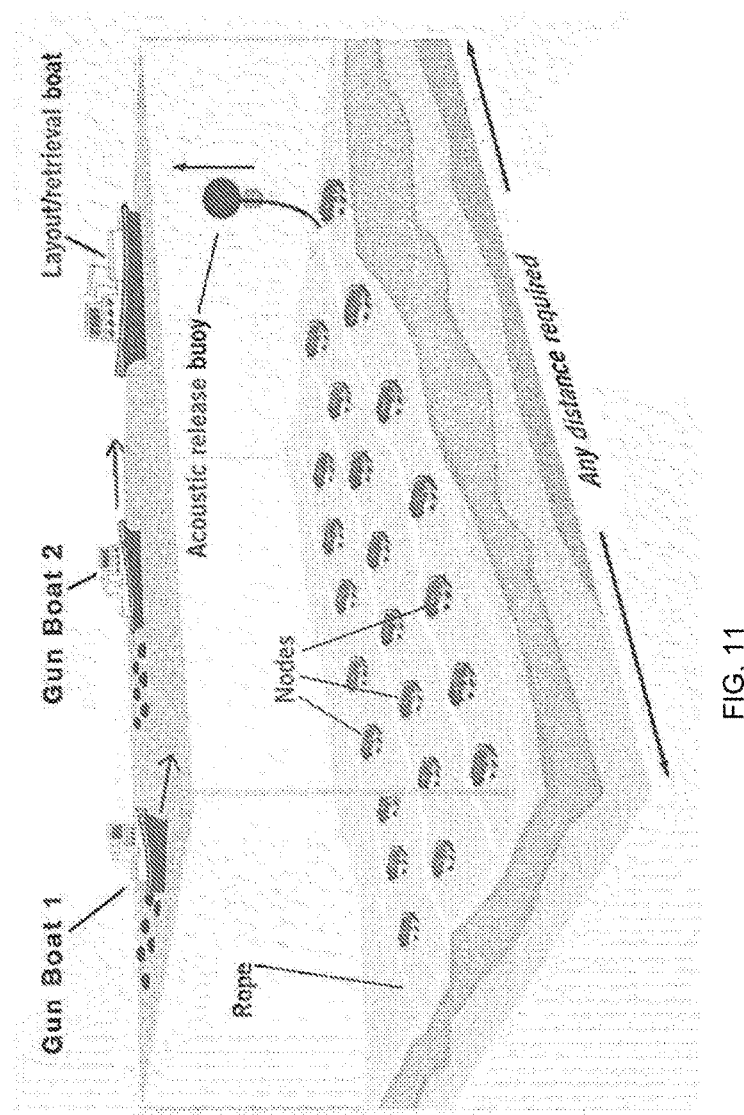
FIG. 11 illustrates a system for conducting a seismic survey with multiple seismic sources featuring a node-on-a-rope deployment technique.
Figure 12:
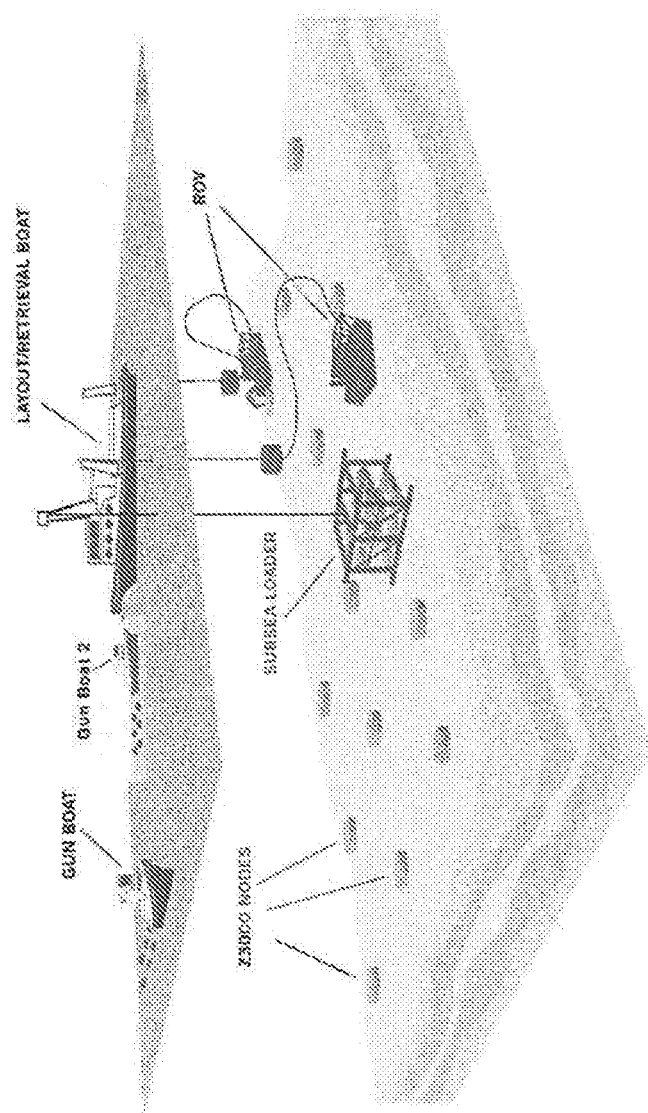
FIG. 12 illustrates a system for conducting a seismic survey with multiple seismic sources featuring an ROV based deployment technique.

Any of the seismometer packages ("pods," "nodes") described above may be employed as part of a seismic survey performed using simultaneous shooting. For example, FIGS. 11 and 12 illustrate exemplary uses of autonomous ocean bottom nodes for performing a seismic survey. These examples and others all may be used in performing a seismic survey with simultaneous shooting. While the nodes and sources discussed herein primarily are discussed in a marine environment, the principles discussed herein may be employed in other contexts, such as land-based sources and nodes (e.g. Vibroseis sources).

FIG. 11 shows an embodiment where autonomous ocean bottom sensors are deployed and retrieved to and from a marine vessel using a "node-on-a-rope" technique. This deployment process is substantially the same as that described above, e.g., in reference to FIGS. 9 and 10. Two seismic source vessels are shown which implement a simultaneous shooting survey after deployment of the nodes. However, it is to be understood that in various embodiments more or fewer source vessels may be used. In some embodiments, the deployment vessel may also serve as a source vessel (e.g., where the source vessel is outfitted with an air gun).

FIG. 12 shows an embodiment where autonomous ocean bottom sensors are deployed and retrieved to and from a marine vessel using a remotely operated vehicle (ROV). As shown, a carrier is used to transport sensor nodes to the ocean bottom, for placement by the ROV. Advantageously, this approach reduces or eliminates the need for frequent return trips by the ROV to the surface for reloading with nodes. This deployment process may be substantially the same as that described above, as in e.g., U.S. Patent Publication No. 2011/0286900, published Nov. 24, 2011, the entire contents of which are incorporated by reference herein. Two seismic source vessels are shown which implement a simultaneous shooting survey after deployment of the nodes. However, it is to be understood that in various embodiments more or fewer source vessels may be used. In some embodiments, the deployment vessel may also serve as a source vessel (e.g., where the source vessel is outfitted with an air gun).

In various embodiments, the nodes may be deployed using other suitable techniques. For example, in some embodiments, the nodes may be dropped from the surface, and may include guidance systems that allow the node to be "flown" through the water to a selected location.

Figure 13:
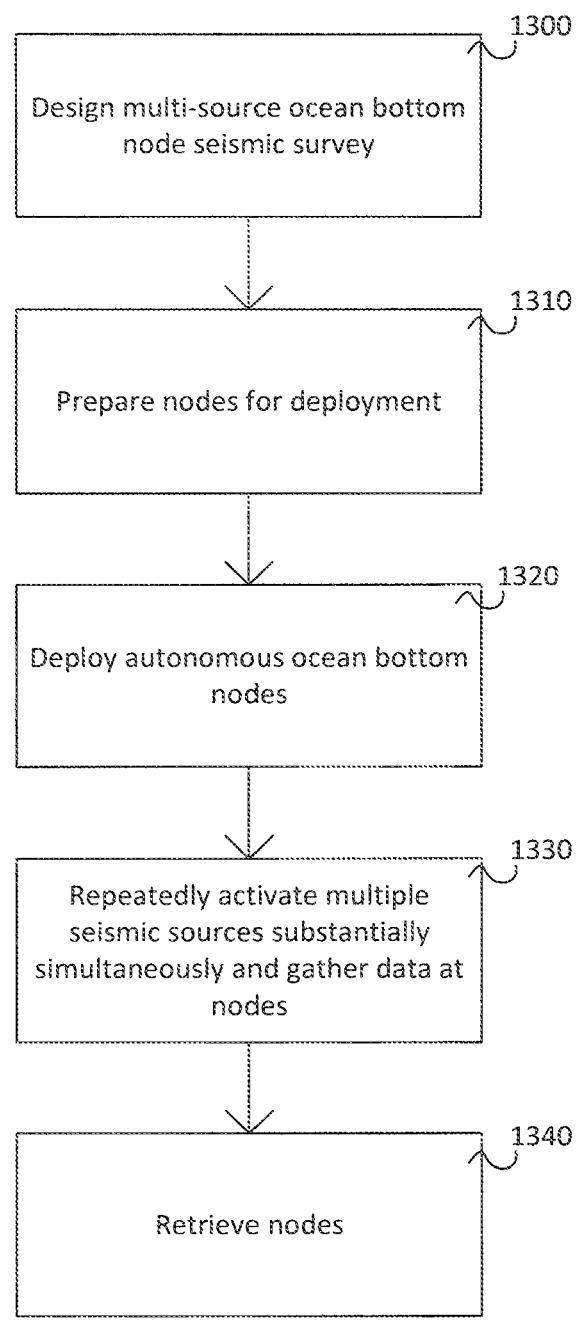
FIG. 13 is a flow diagram for a method of conducting a seismic survey with multiple seismic sources.

A seismic survey as described herein may include one or more phases in which nodes are deployed to collect seismic data and then are retrieved, as well as one or more phases in which data is extracted from nodes and processed. An exemplary process for acquiring data using these nodes is now described with reference to FIG. 13. At step 1300, a multi-source ocean bottom node seismic survey is designed for a specific area. The use of multi-sources may benefit a seismic survey by reducing the amount of time it takes to conduct or by increasing the amount of data in density or area than can be acquired in a given time frame. At step 1310, the nodes are prepared for deployment. The preparations may include calibrating the nodes, synchronizing the nodes to a master clock, and activating the nodes, e.g., for continuous recording. In some implementations, the synchronization may occur at a later, e.g., time after the nodes have been deployed, used to collect data, and subsequently retrieved. In such an implementation, the nodes may be synchronized to the master clock before shutdown, and the timing of recorded data can be determined retroactively based on the difference between the time a particular datum was recorded and the time when the node is synchronized. In other implementations, the nodes may be synchronized during deployment. For example, in the case of a land based or shallow water survey, the nodes may be able to receive a signal such as a global positioning system signal that may be used for synchronization. Examples of land based nodes may be found, e.g., in U.S. Patent Application No. 61/722,024 filed Nov. 2, 2012, U.S. Pat. No. 7,561,493, granted Jul. 14, 2009, and U.S. Patent Pub. No. 2009/0290453 published Nov. 26, 2009, the entire contents of each of which are incorporated by reference herein. Similarly, in some embodiments, ocean bottom nodes may be synchronized when deployed on the ocean bottom before, after, or during the survey. In some embodiments, this may be accomplished using an underwater communication link (e.g., an optical link, a wireless link radio link, an inductive link, etc.) between the node and an ROV in the vicinity of node. The ROV can provide a time signal via a tethered link with the deployment vessel, which may in turn access a GPS or other time reference.

At step 1320, the autonomous ocean bottom nodes are deployed. The nodes may be placed at predetermined locations on the ocean floor according to design considerations of the seismic survey. In certain implementations, such as the exemplary implementation shown in FIG. 11, the nodes may be deployed by being trailed off of a boat in series, each of the nodes being connected to the linearly immediately preceding and following nodes by a rope, cable, etc. As described herein, the nodes are operationally autonomous in that neither power, nor data, nor operational instructions are transmitted by the rope, which is designed strictly for keeping the nodes physically connected, allowing for simplified deployment and collection. In other implementations, such as the exemplary implementation shown in FIG. 12, the nodes may be physically independent of one another as well, and may be deployed individually by a remote-operated vehicle. One or more nodes may be lowered from a boat, for example in a cage or basket, and the remote-operated vehicle may collect the nodes from the cage or basket one at a time and distribute them to the desired locations. In some implementations, nodes may be placed in especially deep locations, such as deeper than 1000 meters below the surface of the ocean. However, in various applications any other suitable deployment depth may be used, e.g., depths greater than 1 meter, 10 meters, 100 meters, 200 meters, 300 meters, 500 meters, 750 meters, 1000 meters, 2000 meters, or more, e.g., in the range of 0-2000 meters or any subrange thereof At step 1330, two or more seismic sources ("shots") are activated substantially simultaneously. The timing of the shots may be staggered slightly according to a dithering strategy to reduce signal artifacting and to facilitate deblending of the signals collected in response to the different shots. In some implementations, multiple gun boats may be employed, each having at least one seismic source. In other implementations, a single gun boat may be employed having multiple seismic sources located in physically separated positions. The firing pattern also may include alternating sequentially between sources. For example, four seismic sources may be located relative to each other such that they substantially are at the four corners of a square. In a first shot of the firing pattern, two of the sources may fire, and in a second shot of the firing pattern, the remaining two sources may fire. In such an implementation, the pairs of sources may be selected such that no two adjacent corners on the square fire together. A precise time and position for each source activation is recorded. The time of the source activation can be recorded by a computer on the gun boat that has been synchronized to the master clock. The position of the source activation may be known from geolocation data such as GPS data. The sources can be activated such that the timing relationships or positional relationship between sources is always changing. The dither time or position change between substantially simultaneous shots may be random, pseudo-random, or a selected function.

In various embodiments, the deployed nodes can continuously detect, digitize and record seismic wavefields (pressure and particle motion) arriving at the ocean bottom during the seismic survey (e.g. using one or more seismic sensors such a hydrophone, geophone, accelerometer, and combinations thereof). The nodes also can periodically detect, digitize and record the orientation in space (e.g., the tilt angle) of the vector motion sensor. A seismic survey may include many repetitions of step 1330 to collect data resulting from firing seismic sources at many locations throughout the survey area. This data can then be used to develop detailed maps and imaging of the subsurface structures in the survey area. The seismic sources repeatedly fire during the survey as described, while the gun boat(s) slowly moves through the survey area to change the physical locations of the seismic sources. In some implementations, the gun boat(s) may travel in straight lines through the survey area, parallel to a side of the square area, turn around 180 degrees upon reaching the end of the area, relocate slightly to the side, and return in a line parallel to the previously travelled path. This movement pattern may be repeated as required until the entire survey area has been covered. In other implementations other vessel path geometries are possible as well, including spiral and coil patterns, snakelike wavy patterns, and any other known survey patterns.

Figure 17:
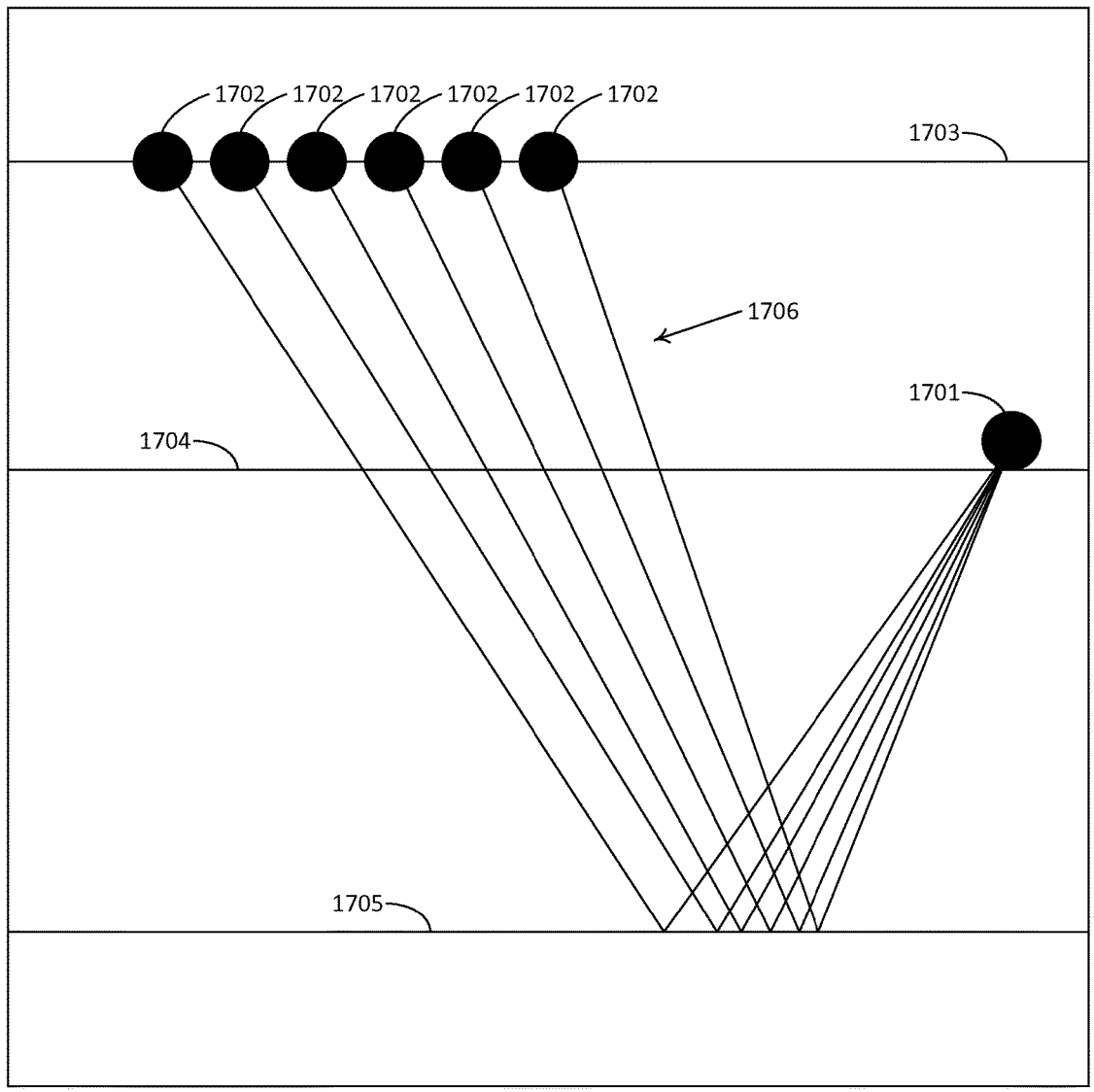
FIG. 17 illustrates a common receiver gather with an ocean bottom node.

An example of a node collecting data in step 1330, which was described above, is shown in FIG. 17. This figure illustrates a common-receiver gather performed using a an ocean-bottom node 1701. A series of shots 1702 and fired at regular or substantially regular intervals from separate geographic locations at sea level 1703. The sonic waves 1706 travel toward and through the ocean floor 1704 and reflect off of a sub-bottom feature 1705. The sonic waves 1706 then return toward the ocean floor 1704, where they are detected and collected by the ocean-bottom node 1701.

In some embodiments, the varying time between simultaneous shots may be provided by causing the shots to occur at varying spatial intervals as the sources are in motion along a survey path (e.g., at constant speed). In other embodiments, regular spatial shot intervals may be used, but the timing of the simultaneous shots controlled to be offset with a time dither as described above.

In various embodiments, the time dither between shots from two different sources may be shorter than the time interval between successive shots by an individual source. Exemplary ratios of dither time (i.e., delay between two substantially simultaneous shots) and shot interval (i.e., delay between two shots from a single source) may be ½, ⅕, 1/10, 1/100, 1/1000, 1/10,000 or less. For example, in some typical embodiments, the dither time may be on the order of 100 milliseconds, while the shot interval is on the order of a second, tens of seconds, a minute, a few minutes, or more.

In some embodiments, it is advantageous to record the time and location of all shots, even if the shots are not part of the production data of the survey (e.g., shots taken during vessel turning operations between survey lines). This allows any blending from these non-production shots to be removed from the production data.

At step 1340, the nodes are retrieved from the ocean bottom after activation of all planned seismic sources at all planned locations. In the case of implementations involving physical connection such as rope between the nodes, the nodes may be collected one at a time by gradually reeling the line in onto the boat. In the case of implementations involving physically unconnected nodes, the nodes may be collected by remote-operated vehicle (ROV) or autonomously operated vehicle (AUV). The continuously recorded data can then be retrieved from each node after it is collected. Measured timing drift also can be used to synchronize data from all nodes. Alternatively, the vehicle may extract the data from the node while leaving the node in place on the ocean bottom using any suitable type of communication link (e.g. an underwater optical data transfer link).

Figure 14:
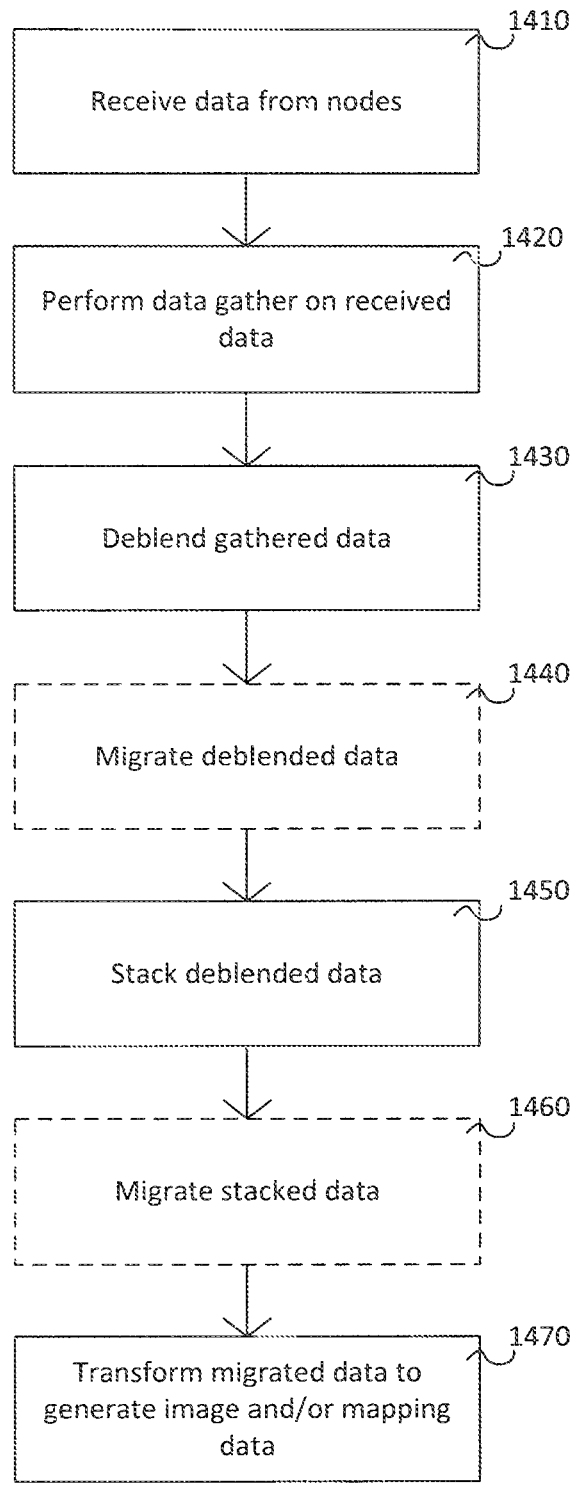
FIG. 14 is a flow diagram for a method of processing data collected in a seismic survey with multiple seismic sources.

An exemplary process for processing acquired data is now described with reference to FIG. 14. At step 1410, the data retrieved from the nodes is received. The step 1420, for each source, the known source activation times are used to extract and organize segments of the continuous recording into common receiver gathers. The length in time of the extracted segments can be determined by a maximum depth of interest, corresponding to the maximum amount of time it is expected that seismic waves will require to reach the maximum depth of interest and return to the sensor. Orientation data also can be used to rotate the particle motion data into vertical and desired horizontal components. The coherent seismic signal in each common receiver gather (described below) can be used to detect and apply refinements in source and receiver positions.

At step 1430, the data is deblended. The common receiver data can be deblended (according to any suitable technique) to produce an approximation of what would have been recorded in a single source experiment by exploiting the property that the desired signal is coherent and the interfering signal is incoherent. The common receiver gathers exhibit a coherent signal from the source for which the activation times were used to extract the data, and they exhibit incoherent interference from all other sources whose activation occurred in the same time interval. The coherence between signal time segments exhibited by the first source is due to the fact that the time intervals between firing of this source (during which time interval the source also is displaced slightly in space to a new location in the survey area) are regular (e.g. 1 minute). The incoherence between the other sources is the result of the continuously changing random dither time mentioned above. The process can be repeated for gathers generated for the other sources, thereby providing deblended data corresponding to each source.

Figure 15:
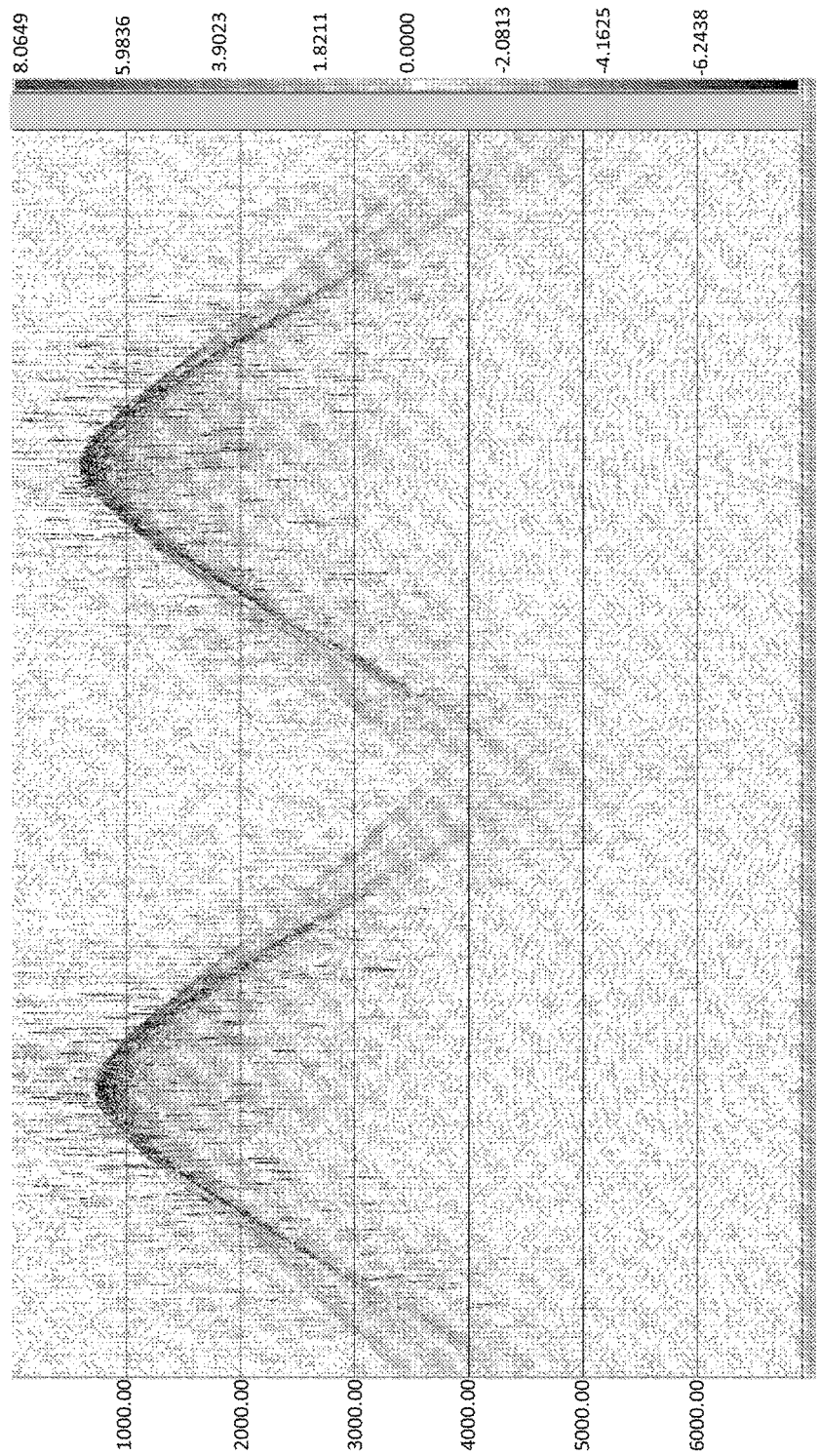
FIG. 15 is a graph showing an example of data collected as part of a seismic survey with multiple seismic sources.
Figure 16:
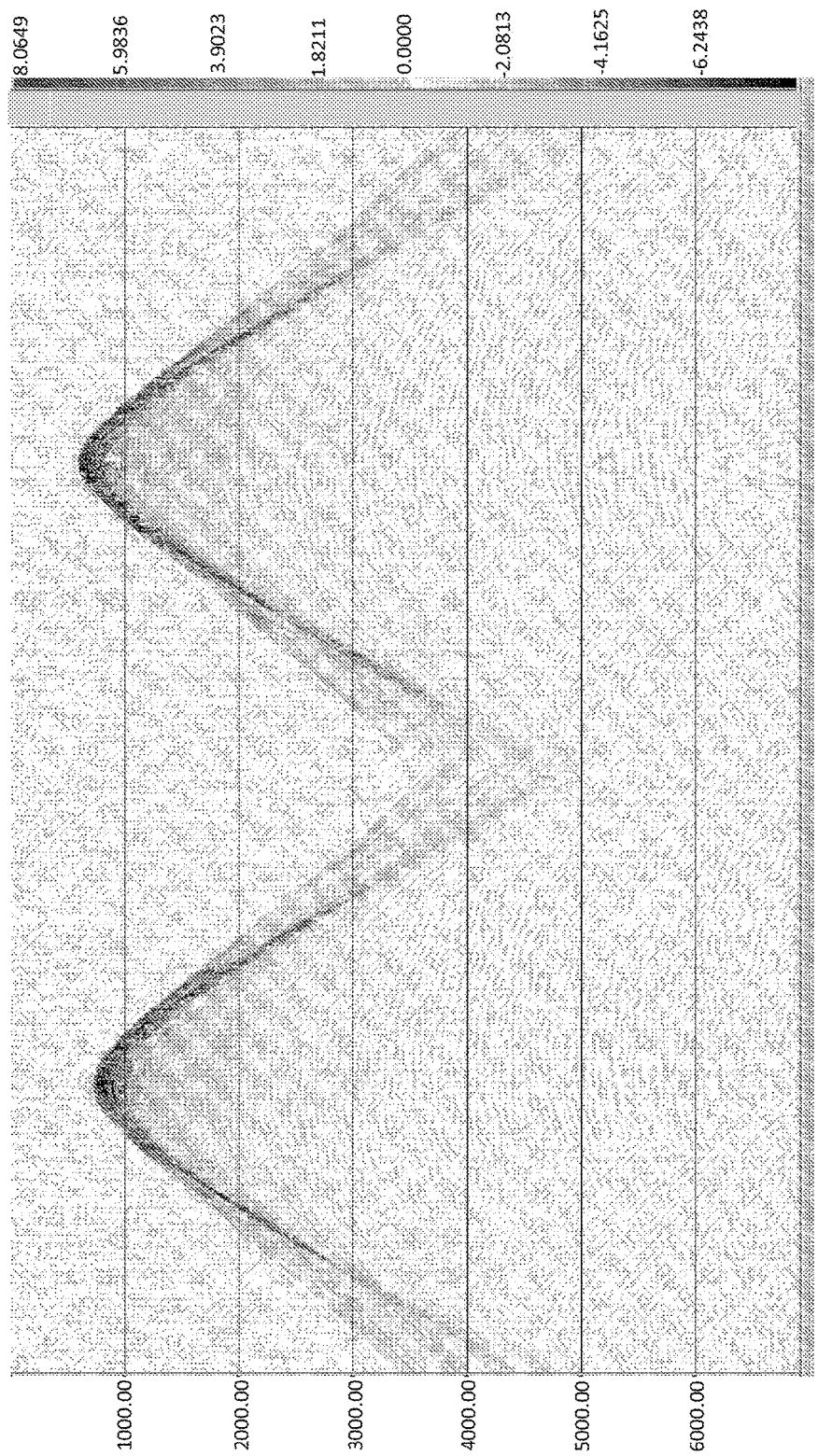
FIG. 16 is a graph showing the result of deblending the data of FIG. 15.

FIG. 15 is a graph showing an example of data collected as part of a seismic survey with multiple seismic sources. FIG. 16 is a graph showing the result of deblending the data of FIG. 15. In the graph of FIG. 15, the outline of a dual-peak structure is discernable, but is blurred by a significant amount of collected signals at other locations in the graph not corresponding to the apparent dual-peak structure. This noise is mostly attributable to the fact that multiple seismic sources are active at the same time from geographically-offset locations. In the graph of FIG. 16, the dual-peak structure is more clearly visible and the noise in the graph has been reduced significantly. This reduction in noise by deblending is made possible by the fact that the first seismic source is coherent and the second source is made incoherent by the application of a small, random time dither. In this example, the two source lines are parallel and about 500 ft apart. At closest approach they come to within 4000 and 4500 ft, respectively, of the stationary receiver. The shot-to-shot interval on each line is nominally 82.5 ft (25 m). Typical boat speeds ~4.6 kt (2.36 m/s) produce a nominal time between shots of ~10600 msec. A random shot timing dither of +/−1000 msec (for both lines) produces the incoherency in the interference.

Note that although one example of deblending is described above, it is to be understood that other techniques may be used, e.g., based on the techniques described in the references cited in Appendix B. In some embodiments, the deblending may use other types of gathers known in the art, such as common midpoint gather, with appropriately adapted coherence- or denoising-based techniques applied to deblend the data. In various embodiments, suitable deblending techniques may include FK filtering, tau-p filtering, time-frequency denoising, FX prediction, singular value decomposition, related techniques, and combinations thereof. For example, some embodiments may use the deblending techniques described in Hennenfent, G., and F. J. Herrmann, 2008, Simply denoise: wavefield reconstruction via jittered undersampling: Geophysics, 73, no. 3, V19-V28, and Herrmann, F. J., 2009, Sub-Nyquist sampling and sparsity: how to get more information from fewer samples: 79th Annual International Meeting, SEG, Extended Abstracts 28, 3410-3413, the entire contents of each of which are incorporated herein by reference.

The deblended data may be processed further as if the data acquisition had been performed with a single source. Exemplary downstream processes for ocean bottom node data include wavefield separation into up-going and down-going components, spatial interpolation and regularization, deconvolution, demultiple, velocity analysis, and migration.

For example, in the embodiment shown, the data is optionally migrated at step 1440. In migrating the data, the deblended sensor data is converted into data representing spatial and physical characteristics of the subsurface structures in the area under survey. At step 1450, the data is stacked. In certain implementations, the data may be stacked before migration, whereas other implementations may include only post-stacking migration, which is optionally performed at step 21460. Stacking of data involves combining multiple sources of data and generating a new data set incorporating the information present from the various input data. The data is then transformed at step 1470 to generate mapping and/or imaging data representing the subsurface structures in two or three dimensions, such as may be suitable for oil and gas exploration.

Although the examples described above are focused on deblending planned seismic source activations, it is to be understood that the techniques may also be applied to deblending signal from unplanned seismic source activations (e.g., due to geological events, third party activity in or near the survey area, etc.), as long as the time and spatial location of the unplanned activation can be at least approximately determined.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The present disclosure is related to the subject matter found in the references, U.S. and International Applications listed in Appendix A and Appendix B, the entire contents of each of which are incorporated herein by reference. All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03

What is claimed is:

1. A system to acquire blended seismic signals, comprising:
    a plurality of seismic sources of a survey region that activate based on a timing function that includes a ratio of a dither time to a shot interval that is less than or equal to ½, wherein the dither time indicates a delay between two shots from two different seismic sources of the plurality of seismic sources and the shot interval indicates a delay between two shots from an individual seismic source of the plurality of seismic sources;
    a plurality of seismic sensors deployed at a plurality of positions in the survey region to record seismic signals generated in response to activation of the plurality of seismic sources; and
    one or more processors to deblend, based on the timing function that includes the ratio of the dither time to the shot interval that is less than or equal to ½, the seismic signals recorded by the plurality of seismic sensors to generate data representing subsurface structures indicative of oil or gas.

2. The system of claim 1, comprising:
    the plurality of seismic sources configured to activate based on a modulation signature configured to identify each of the plurality of seismic sources.

3. The system of claim 1, wherein the dither time includes a variable dither time, the system comprising:

a first seismic source of the plurality of seismic sources configured to activate at a first time; and
a second seismic source of the plurality of seismic sources configured to activate at a second time separated by the first time based on the variable dither time.

4. The system of claim 3, comprising:
the first seismic source of the plurality of seismic sources configured to activate at a third time separated by the second time based on the variable dither time;
the second seismic source of the plurality of seismic sources configured to activate at a fourth time separated by the third time based on the variable dither time.

5. The system of claim 3, comprising:
a first seismic sensor of the plurality of seismic sensors configured to record a blended seismic signal.

6. The system of claim 1, wherein each of the plurality of seismic sensors comprises:
a disk-shaped water tight case formed of two parallel plates joined around a periphery by a wall.

7. The system of claim 1, comprising:
a first seismic source of the plurality of seismic sources located at a first corner of the survey region to activate at a first time;
a second seismic source of the plurality of seismic sources located at a second corner of the survey region to activate at the first time;
a third seismic source of the plurality of seismic sources located at a third corner of the survey region to activate at a second time separated from the first time based on the dither time;
a fourth seismic source of the plurality of seismic sources located at a fourth corner of the survey region at the second time separated from the first time based on the dither time.

8. The system of claim 1, comprising:
the plurality of seismic sources configured to move from a first location to a second location in accordance with a movement pattern; and
the plurality of seismic sources configured to activate based on the timing function in the first location and the second location.

9. The system of claim 1, comprising:
the plurality of seismic sources configured to move from a first location to a second location in accordance with a movement pattern;
the plurality of seismic sources configured to activate based on a first dither time in the first location; and
the plurality of seismic sources configured to activate based on a second dither time in the second location, the second dither time different from the first dither time.

10. The system of claim 1, comprising:
a first seismic source of the plurality of seismic sources configured to activate at a first shot interval at a first location and a second location; and
a second seismic source of the plurality of seismic sources configured to activate at a second shot interval at a third location and a fourth third shot interval at a fourth location, the fourth shot interval different from the second dither time.

11. The system of claim 1, comprising:
the one or more processors configured to coherently combine data corresponding to multiple activations of the plurality of seismic sources using coherent data from at least a portion of the plurality of seismic sensors.

12. A method of acquiring blended seismic signals, comprising:
deploying a plurality of seismic sensors at a plurality of positions in a survey region to record seismic signals generated in response to activation of a plurality of seismic sources;
activating the plurality of seismic sources of the survey region based on a timing function that includes a ratio of a dither time to a shot interval that is less than or equal to ½, wherein the dither time indicates a delay between two shots from two different seismic sources of the plurality of seismic sources and the shot interval indicates a delay between two shots from an individual seismic source of the plurality of seismic sources; and
deblending, by one or more processor, based on the timing function that includes the ratio of the dither time to the shot interval that is less than or equal to ½, the seismic signals recorded by the plurality of seismic sensors to generate data representing subsurface structures indicative of oil or gas.

13. The method of claim 12, comprising:
activating the plurality of seismic sources based on a modulation signature configured to identify each of the plurality of seismic sources.

14. The method of claim 12, wherein the dither time includes a variable dither time, the method comprising:
activating a first seismic source of the plurality of seismic sources at a first time; and
activating a second seismic source of the plurality of seismic at a second time separated by the first time based on the variable dither time.

15. The method of claim 14, comprising:
activating the first seismic source of the plurality of seismic sources at a third time separated by the second time based on the variable dither time; and
activating the second seismic source of the plurality of seismic sources at a fourth time separated by the third time based on the variable dither time.

16. The method of claim 14, comprising:
recording, by a first seismic sensor of the plurality of seismic sensors, a blended seismic signal.

17. The method of claim 12, comprising:
activating a first seismic source of the plurality of seismic sources at a first corner of the survey region to at a first time;
activating a second seismic source of the plurality of seismic sources located at a second corner of the survey region at the first time;
activating a third seismic source of the plurality of seismic sources located at a third corner of the survey region at a second time separated from the first time based on the dither time; and
activating a fourth seismic source of the plurality of seismic sources located at a fourth corner of the survey region at the second time separated from the first time based on the dither time.

18. The method of claim 12, comprising:
moving the plurality of seismic sources configured from a first location to a second location in accordance with a movement pattern; and
activating the plurality of seismic sources based on the timing function in the first location and the second location.

19. The method of claim 12, comprising:
moving the plurality of seismic sources from a first location to a second location in accordance with a movement pattern;

activating the plurality of seismic sources based on a first dither time in the first location; and activating the plurality of seismic sources based on a second dither time in the second location, the second dither time different from the first dither time.

20. The method of claim 12, comprising:

coherently combining, by the one or more processors, data corresponding to multiple activations of the plurality of seismic sources using coherent data from at least a portion of the plurality of seismic sensors.

* * * * *